(12) United States Patent
Sakurai et al.

(10) Patent No.: US 9,364,742 B2
(45) Date of Patent: Jun. 14, 2016

(54) STORAGE MEDIUM, GAME APPARATUS, GAME CONTROLLING METHOD AND GAME SYSTEM

(75) Inventors: Masahiro Sakurai, Tokyo (JP); Yoshiyasu Okawara, Tokyo (JP); Yoichi Hirakawa, Tokyo (JP); Michiko Sakurai, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 37 days.

(21) Appl. No.: 13/156,833

(22) Filed: Jun. 9, 2011

(65) Prior Publication Data

US 2011/0319167 A1    Dec. 29, 2011

(30) Foreign Application Priority Data

Jun. 11, 2010   (JP) ................................. 2010-133473

(51) Int. Cl.
*A63F 9/24* (2006.01)
*A63F 13/00* (2014.01)
*A63F 13/30* (2014.01)

(52) U.S. Cl.
CPC ................ *A63F 13/00* (2013.01); *A63F 13/12* (2013.01); *A63F 2300/204* (2013.01); *A63F 2300/405* (2013.01); *A63F 2300/575* (2013.01); *A63F 2300/8058* (2013.01)

(58) Field of Classification Search
CPC .............. A63F 13/12; A63F 2300/575; A63F 2300/406
See application file for complete search history.

(56) References Cited

U.S. PATENT DOCUMENTS

| | | | |
|---|---|---|---|
| 6,595,858 B1* | 7/2003 | Tajiri et al. ...................... | 463/31 |
| 2003/0100375 A1* | 5/2003 | Wakae et al. ................... | 463/43 |
| 2003/0134679 A1* | 7/2003 | Siegel et al. .................... | 463/43 |
| 2004/0259642 A1* | 12/2004 | Tanaka et al. ................... | 463/42 |
| 2006/0218178 A1* | 9/2006 | Cannon et al. ................ | 707/102 |
| 2006/0265378 A1* | 11/2006 | Koseki .............................. | 707/9 |
| 2009/0325690 A1* | 12/2009 | Zhou et al. ...................... | 463/29 |

FOREIGN PATENT DOCUMENTS

| | | |
|---|---|---|
| JP | 2001-321568 | 11/2001 |
| JP | 2005-28103 | 2/2005 |
| JP | 2009-187143 | 8/2009 |

OTHER PUBLICATIONS

"Shin Megami Tensai: Persona 3 FES". Amazon.com. Online. Accessed via the Internet. Accessed Jan. 23, 2013. <URL: http://www.amazon.com/Shin-Megami-Tensei-Persona-Playstation-2/dp/B0014CN2H6/ref=sr_1_1?ie=UTF8&qid=1358959718&sr=8-1>.*

(Continued)

*Primary Examiner* — Pierre E Elisca
*Assistant Examiner* — Carl V Larsen
(74) *Attorney, Agent, or Firm* — Nixon & Vanderhye, P.C.

(57) ABSTRACT

A game apparatus includes a CPU, and the CPU sets a weapon to be transmittable according to an instruction by a player. More specifically, a seed is generated from a weapon, and transmittable seed data corresponding to the generated seed is stored in a memory for saved data. When a game apparatus is carried in a sleep state by a player, it makes a communication with another game apparatus to thereby transmit and receive the transmittable seed data with the other game apparatus. Accordingly, the transmittable and receivable seed data, that is, the seeds are exchanged. During the game, the received two seeds are fused to thereby generate a weapon.

16 Claims, 19 Drawing Sheets

(A) FUSION SETTING SCREEN 300

(B) GENERATION RESULT SCREEN 400

(56) References Cited

OTHER PUBLICATIONS

Arthellinus. "Shin Megami Tensai: Persona 3 FES Fusion Database". Gamefaqs.com. Online. May 27, 2008. Accessed via the Internet. Accessed Jan. 23, 2012. <URL:http://www.gamefaqs.com/ps2/937269-shin-megami-tensei-persona-3-fes/faqs/52531>.*

Japanese Office Action for Patent Application No. 2010-133473 dated May 7, 2014 (with translation).

"Konami Official Books Power Pro Kun Packet 11 Complete Official Guide," published by Konami Digital Entertainment Co., Ltd., Feb. 26, 2009, First Edition, pp. 231, 239.

"Ken to Maho to Gakuenmono, 2 The Complete Guide", published by ASCII Media Works Inc, Aug. 7, 2009, First Edition, pp. 107, 117, 125, 126, 201, and 206.

* cited by examiner (A) TOP VIEW (FOLDED STATE)

(B) LEFT SIDE VIEW (FOLDED STATE)

(A) GAME SCREEN 100

(B) TRANSMISSION SETTING SCREEN 200

(A) FUSION SETTING SCREEN 300

(B) GENERATION RESULT SCREEN 400

FIG. 6

FUSION TABLE

| SEED 1 | SEED 2 | WEAPON | COIN (NUMBER) | LEVEL |
|---|---|---|---|---|
| A | A | WEAPON 1 | 10 | 1 |
| A | B | WEAPON 2 | 20 | 10 |
| A | C | WEAPON 3 | 30 | 15 |
| A | D | WEAPON 4 | 30 | 15 |
| B | B | WEAPON 5 | 10 | 5 |
| B | C | WEAPON 6 | 20 | 10 |
| B | D | WEAPON 7 | 30 | 15 |
| C | C | WEAPON 8 | 10 | 1 |
| C | D | WEAPON 9 | 20 | 10 |
| D | D | WEAPON 10 | 30 | 15 |

STORAGE MEDIUM, GAME APPARATUS, GAME CONTROLLING METHOD AND GAME SYSTEM

CROSS REFERENCE OF RELATED APPLICATION

The disclosure of Japanese Patent Application No. 2010-133473 filed on Jun. 11, 2010 is incorporated herein by reference.

BACKGROUND OF THE INVENTION

1. Field of the Invention

The present invention relates to a storage medium, a game apparatus, a game controlling method and a game system. More specifically, the present invention relates to a storage medium, a game apparatus, a game controlling method and a game system which transmit and receive game data.

2. Description of the Related Art

One example of the related art is disclosed in Japanese Patent Application Laying-Open No. 2005-28103 [A63F 13/10, A63F 13/12] (Document 1) laid-open on Feb. 3, 2005. In a game apparatus of the document 1, when a communication state is established with another game apparatus, game data is exchanged (transmitted and received) with the other game apparatus.

However, in the game apparatus disclosed in the document 1, the given game data can be used as it is, resulting in lacks of interest and surprises of the game. Furthermore, the received game data can immediately be used, and therefore, if a character which appears only when the game proceeds to the latter part of the game is obtained at the beginning of the game, the game balance is lost, so that there is fear that a willingness to advance the game and interest of the game might be reduced.

SUMMARY OF THE INVENTION

Therefore, it is a primary object of the present invention to provide a storage medium, a game apparatus, a game controlling method, and a game system which utilize the transmitted and received game data by a novel method.

Another object of the present invention is to provide a storage medium, a game apparatus, a game controlling method, and a game system capable of increasing interest of a game in a case that game data is transmitted and received.

A further object of the present invention is to provide a storage medium, a game apparatus, a game controlling method, and a game system capable of preventing a game balance from being lost in a case that game data is transmitted and received.

A first invention is a storage medium storing a game program, and the game program causes a processor of a game apparatus capable of making a communication to function as a game advancer, a local-originated game data chooser, a seed data generator, a seed data transmitter, a seed data receiver, a seed data storage, and a game data generator. The game advancer gives predetermined game data by advancing a game according to an operation by a player, stores local-originated game data being the obtained game data in a storage, and advances the game by using the local-originated game data or making the same usable. The local-originated game data chooser chooses at least one game data from the local-originated game data. The seed data generator generates seed data from the local-originated game data chosen by the local-originated game data chooser. The seed data transmitter transmits the seed data generated by the seed data generator to another game apparatus. The seed data receiver receives seed data transmitted from the other game apparatus. The seed data storage stores the seed data received by the seed data receiver in the storage. The game data generator generates, when the seed data stored in the storage by the seed data storage satisfies a predetermined condition, predetermined game data on the basis of the seed data. And, the game advancer advances the game by using the local-originated game data and communication-originated game data being the predetermined game data generated by the game data generator.

According to the first invention, in a case that the seed data generated from the game data satisfies the predetermined condition, the predetermined game data is generated on the basis of the seed data, and by using the seed data, the game is advanced. Thus, the given data cannot be used as it is, and some conditions are to be satisfied for generating the game data from the given data, and therefore, it is possible to increase interest of data transmission and reception and game playing.

A second invention is according to the first invention, wherein the predetermined condition in the game data generator is to combine two or more seed data.

According to the second invention, two or more seed data is combined, and therefore, it is possible to enjoy unexpectedness of the generated game data. Furthermore, at least two or more seed data is required to be received, and therefore, it is impossible to easily generate and use the game data. Accordingly, it is possible to prevent inconvenience of obtaining an item which will appear in the latter half of the game immediately after the start of the game from occurring. That is, it is possible to keep the game balance.

A third invention is according to the first invention, wherein the game advancer gives a predetermined point (coin, experience point, or level in this embodiment) by further advancing the game according to an operation by the player, and accumulatively stores point data as to the point in the storage, and the predetermined condition in the game data generator is that a value indicated by the point data is equal to or more than a predetermined value.

According to the third invention, in a case that points obtained by advancing the game are not equal to or more than the predetermined value, a predetermined item is not generated, and therefore, similar to the second invention, it is impossible to easily generate and use the game data, capable of keeping the game balance. For example, if points which are difficult to obtain without playing the game for a certain length of time are required for generating the item which appears in the latter half of the game, the game balance can be kept.

A fourth invention is according to the third invention, wherein the local-originated game data chooser chooses at least one game data from the local-originated game data based on an operation by the player. The seed data transmitter repetitively sets the seed data which was transmitted once to the other game apparatus to be transmittable. The game program causes the processor to further function as a use prohibiter and a use permitter. The use prohibiter sets the local-originated game data chosen by the local-originated game data chooser to be unusable in the game by the game advancer. That is, when transmission of the seed data is set, using the game data from which this seed data is generated is prohibited. The use permitter sets, when a choice of the local-originated game data by the local-originated game data chooser is cancelled, the local-originated game data to a using state or a useable state. That is, when setting of the transmission of the seed data is cancelled, using the game data from which this seed data is generated is permitted.

According to the fourth invention, the seed data can repetitively be transmitted, and therefore, it is possible to increase the possibility of transmitting and receiving the data. Also, when a transmission setting is performed on the seed data, using the game data from which the seed data is generated is prohibited, and thus, tactics to divide between use for transmission and use for the game, etc. need to be conceived, and therefore, it is possible to increase interest of the game. Furthermore, when the transmission setting of the seed data is cancelled, the original game data can be used, and therefore, it seems that even an important or precious game item (weapon, etc.), for example, may be transmitted in a case that it is currently not in use. Thus, an opportunity of transmission and reception of the important or precious game item is grown, and a charm of a transmitting and receiving function of the game data is increased.

A fifth invention is according to the first invention, wherein the communication-originated game data includes at least one parameter. The game advancer randomly changes a value of the parameter included in the communication-originated game data when the game processing based on the communication-originated game data is performed.

According to the fifth invention, the value of the parameter included in the communication-originated game data is randomly changed, and therefore, it is possible to prevent the game from being monotone.

A sixth invention is according to the fifth invention, wherein the game advancer gives a predetermined point by further advancing the game according to an operation by the player, accumulatively stores point data indicating the point in the storage, and restricts a changed value for changing the value of the parameter included in the communication-originated game data based on the point indicated by at least the point data. For example, by using points, the difficulty level of the game is changed, and depending on at least the difficulty level of the game, the maximum value of the parameter value is decided. Here, the more the points are, the larger the maximum value is.

According to the sixth invention, the maximum value of the changed value for changing the parameter value included in the communication-originated game data in correspondence with the points is made large as the points are more, and therefore, it is possible to increase willingness to advance the game.

A seventh invention is according to the first invention, wherein the local-originated game data includes at least one parameter. The game advancer randomly changes the value of the parameter included in the local-originated game data when the game processing based on the local-originated game data is performed in the game.

According to the seventh invention as well, similar to the fifth invention, it is possible to prevent the game from being monotone.

An eighth invention is according to the first invention, wherein the communicator executes a short distance wireless communication.

According to the eighth invention, it is possible to easily transmit and receive data with nearby other game apparatuses or computers, or nearby access points.

A ninth invention is according to the eighth invention, wherein the game apparatus is a portable game apparatus.

According to the ninth invention, the game apparatus can easily be carried, and therefore, it is possible to increase the possibility of data transmission and reception.

A tenth invention is according to the ninth invention, wherein the communicator repetitively searches another game apparatus existing in a coverage area to automatically make a wireless connection, and automatically transmits and receives the seed data by the seed data transmitter and the seed data receiver with the other game apparatus with which the wireless connection is made.

According to the tenth invention, the seed data is automatically transmitted and received, and therefore, it is possible to save the player the trouble of transmitting and receiving data, and can obtain data without the player knowing it.

An eleventh invention is according to the first invention, wherein the game advancer gives the seed data by further advancing the game and stores the obtained local-originated seed data being the seed data in the storage, and the seed data chooser chooses at least one of the communication-originated seed data and the local-originated seed data. That is, based on the seed data obtained by advancing the game or the seed data obtained through communications, the predetermined game data is generated, or by combining the seed data obtained by advancing the game and the seed data obtained through communications, the predetermined game data is generated.

According to the eleventh invention, it is possible to more enjoy unexpectedness of the predetermined game data generated based on the seed data.

A twelfth invention is a game apparatus capable of making a communication comprising a game advancer which gives predetermined game data by advancing a game according to an operation by a player, stores local-originated game data being the obtained game data in a storage, and advances the game by using the local-originated game data or making the same usable; a local-originated game data chooser which chooses at least one game data from the local-originated game data; a seed data generator which generates seed data from the local-originated game data chosen by the local-originated game data chooser; a seed data transmitter which transmits the seed data generated by the seed data generator to another game apparatus; a seed data receiver which receives seed data transmitted from the other game apparatus; a seed data storage which stores the seed data received by the seed data receiver in the storage; and a game data generator which, when the seed data stored in the storage by the seed data storage satisfies a predetermined condition, generates predetermined game data on the basis of the seed data, wherein the game advancer advances the game by using the local-originated game data and communication-originated game data being the predetermined game data generated by the game data generator.

A thirteenth invention is a game controlling method of a game apparatus capable of making a communication and having a storage including steps of (a) giving predetermined game data by advancing a game according to an operation by a player, storing local-originated game data being the obtained game data in a storage, and advancing the game by using the local-originated game data or making the same usable; (b) choosing at least one game data from the local-originated game data; (c) generating seed data from the local-originated game data chosen by the step (b); (d) transmitting the seed data generated by the step (e) to another game apparatus; (e) receiving seed data transmitted from the other game apparatus; (f) storing the seed data received by the step (e) in the storage; (g) generating, when the seed data stored in the storage by the step (f) satisfies a predetermined condition, predetermined game data on the basis of the seed data, wherein the step (a) advances the game by using the local-originated game data and communication-originated game data being the predetermined game data generated by the step (g).

A fourteenth invention is a game system having a plurality of game apparatuses capable of making a communication, each of the game apparatuses comprising: a game advancer which gives predetermined game data by advancing a game according to an operation by a player, stores local-originated game data being the obtained game data in a storage, and advances the game by using the local-originated game data or making the same usable; a local-originated game data chooser which chooses at least one game data from the local-originated game data; a seed data generator which generates seed data from the local-originated game data chosen by the local-originated game data chooser; a seed data transmitter which transmits the seed data generated by the seed data generator to another game apparatus; a seed data receiver which receives seed data transmitted from the other game apparatus; a seed data storage which stores the seed data received by the seed data receiver in the storage; and a game data generator which, when the seed data stored in the storage by the seed data storage satisfies a predetermined condition, generates predetermined game data on the basis of the seed data, wherein the game advancer advances the game by using the local-originated game data and communication-originated game data being the predetermined game data generated by the game data generator.

In the twelfth to the fourteenth inventions as well, similar to the first invention, it is possible to increase interest of an exchange of data and game playing.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view showing one example of a fusion table to be used when a weapon is generated from seeds;

DETAILED DESCRIPTION OF THE PREFERRED EMBODIMENTS

Figure 1:
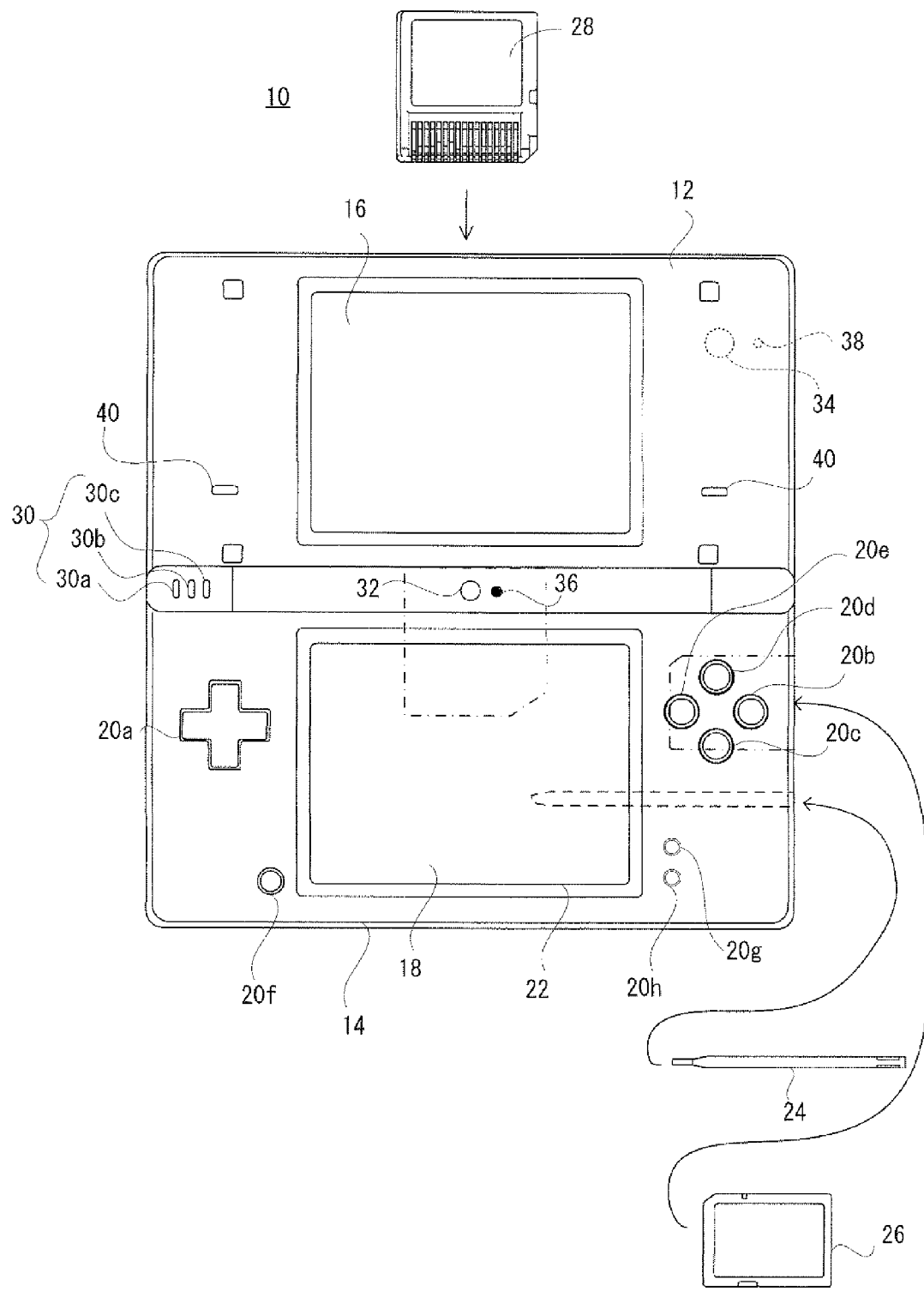
FIG. 1 is an illustrative view showing one embodiment of an external configuration of a game apparatus of the present invention.

Referring to FIG. 1, a game apparatus 10 of one embodiment of the present invention includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding portable game apparatus, and in FIG. 1, the game apparatus 10 is shown in an opened state (in an open state). The game apparatus 10 is constructed such a size that the user can hold with both hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at the arbitrary angle.

Additionally, the game apparatus 10 is mounted with cameras (32, 34) described later, functioning as an imaging device, such as imaging an image with the cameras (32, 34), displaying the imaged image on the screen, and saving the imaged image data.

As shown in FIG. 1, the upper housing 12 is provided with a first LCD 16, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second. LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution.

Figure 2:
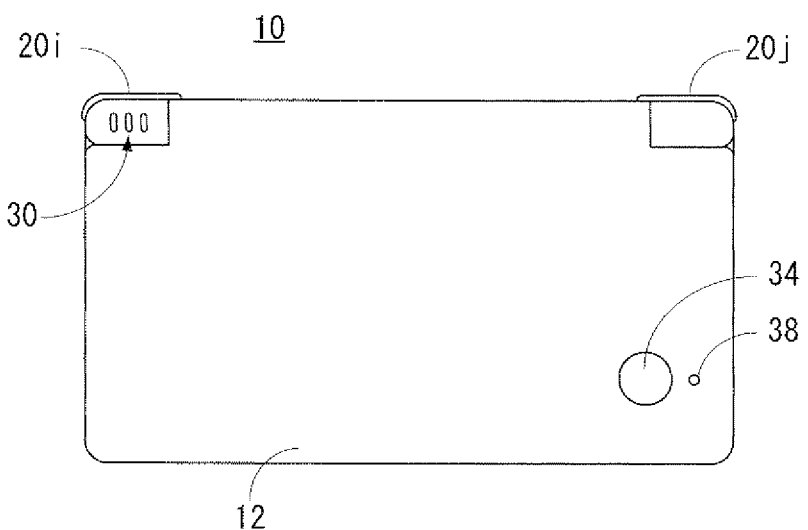
FIG. 2 is an illustrative view showing a top view and a left side view of the game apparatus shown in FIG. 1 in a folded manner.
Figure 2:
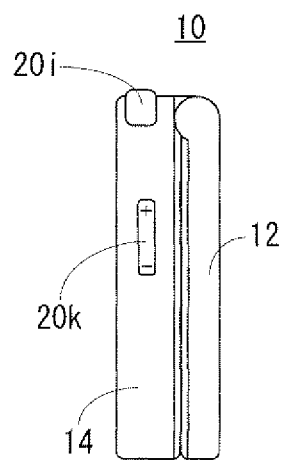

As shown in FIG. 1 and FIG. 2, the lower housing 14 is provided with respective operation buttons 20a-20k as input devices. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although the operation buttons 20i-20k are omitted in FIG. 1, as shown in FIG. 2 (A), the operation button (L button) 20i is provided at the left corner of the upper side surface of the lower housing 14, and the operation button (R button) 20j is provided at the right corner of the upper side surface of the lower housing 14. Furthermore, as shown in FIG. 2 (B), the volume button 20k is provided on the left side surface of the lower housing 14.

FIG. 2 (A) is an illustrative view of the game apparatus 10 in a folded manner as seen from a top surface (upper housing 12). FIG. 2 (B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. Furthermore, in this embodiment, the L button 20i and the R button 20j can also be used for an operation of an imaging instruction (shutter operation). The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is further provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot and the housing portion for the touch pen 24 need not be provided.

Moreover, on the right side surface of the lower housing 14, a loading slot for housing a memory card 26 (represented by a chain double-dashed line in FIG. 1) is provided. Inside of the loading slot, a connector (not illustrated) for electrically connecting the game apparatus 10 and the memory card 26 is provided. The memory card 26 is an SD card, for example, and is detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. Inside the loading slot as well, a connector (not illustrated) for electrically connecting the game apparatus 10 and the memory card 28 is provided. The memory card 28 is a recording medium of recording an information processing program, necessary data, etc. and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another appliance, and the first LED 30a lights up when a wireless communication with the appliance is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

Although illustration is omitted, a switch (opening and closing switch 42: see FIG. 3) that is switched in response to opening and closing of the game apparatus 10 is provided inside the hinge. For example, the opening and closing switch 42 is turned on when that the game apparatus 10 is in an opened state. On the other hand, the opening and closing switch 42 is turned off when that the game apparatus 10 is in a closed (folded) state. Here, it is only necessary to find that the game apparatus 10 is in the opened state or the closed state, and therefore, the turning on and off the opening and closing switch 42 may be reversed.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18. For example, on the second LCD 18, an operation explanatory screen for teaching the use how the respective operation buttons 20a-20k and the touch panel 22 work or how to operate them, and a game screen are displayed.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2 (A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in this embodiment, the two cameras 32, 34 are provided such that the imaging directions of the inward camera 32 and the outward camera 34 are opposite with each other. For example, the user holding the game apparatus 10 can image a landscape (including the user, for example) as the user is seen from the game apparatus 10 with the inward camera 32, and can image a landscape as the direction opposite to the user is seen from the game apparatus 10 with the outward camera 34 and other users.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position for housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 stays lit up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which are configured to image an image, and the first LCD 16 as a displayer for mainly displaying the imaged image and a game screen. On the other hand, the lower housing 14 is provided with the input device (operation button 20 (20a-20k) and the touch panel 22) for performing an operation input to the game apparatus 10 and the second LCD 18 as a displayer for mainly displaying an operation explanatory screen and a game screen. Accordingly, the game apparatus 10 has two screens (16, 18) and two kinds of operating portions (20, 22).

Figure 3:
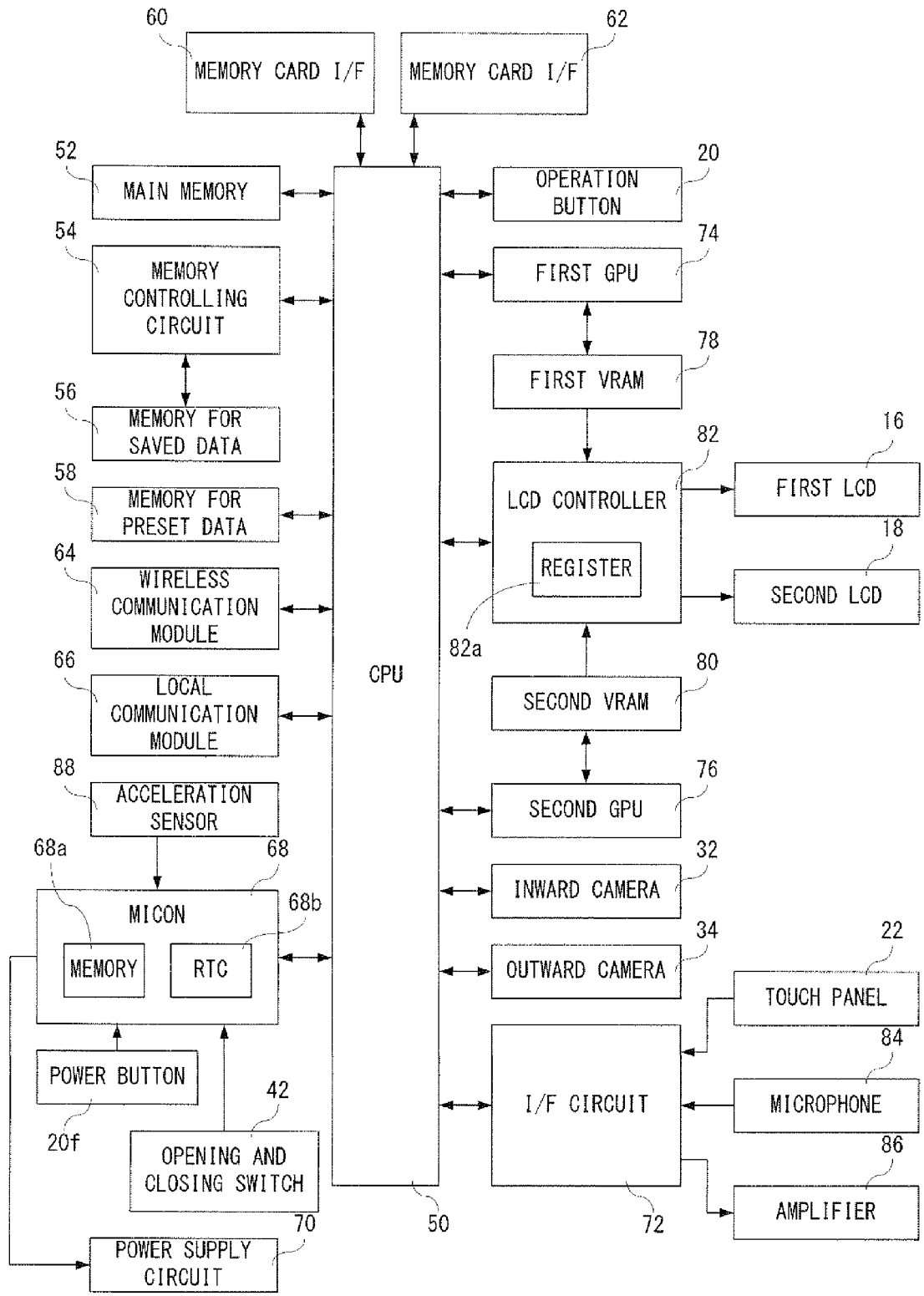
FIG. 3 is a block diagram showing an electric configuration of the game apparatus shown in FIG. 1.

FIG. 3 is a block diagram showing an electric configuration of the game apparatus 10 of this embodiment. As shown in FIG. 3, the game apparatus 10 includes electronic components, such as a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a micon 68, a power supply circuit 70, an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes information processing described later by executing the predetermined program.

Here, the program to be executed by the CPU 50 may be previously stored in the memory within the game apparatus 10, acquired from the memory card 26 and/or 28, and acquired from another appliance by communicating with this another appliance.

The CPU 50 is connected with the main memory 52, the memory controlling circuit 54, and the memory for preset data 58. The memory controlling circuit 54 is connected with the memory for saved data 56. The main memory 52 is a memory means to be utilized as a work area and a buffer area of the CPU 50. That is, the main memory 52 stores (temporarily stores) various data to be utilized in the aforementioned information processing, and stores a program from the outside (memory cards 26 and 28, and another appliance). In this embodiment, as a main memory 52, a PSRAM (Pseudo-SRAM) is used, for example. The memory for saved data 56 is a memory means for storing (saving) a program to be executed by the CPU 50, data of an image imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a memory means for storing data (preset data), such as various parameters, etc. which are previously set in the game apparatus 10. As a memory for preset data 58, a flash memory to be connected to the CPU 50 through an SPI (Serial Peripheral Interface) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the image imaged by the inward camera 32 and the outward camera 34 and image data received by other devices are written to the memory card 26, and the image data stored in the memory card 26 is read from the memory card 26 and stored in the memory for saved data 56, and sent to other devices. Furthermore, the various programs stored in the memory card 28 are read by the CPU 50 so as to be executed.

Here, the information processing program such as a game program is not only supplied to the game apparatus 10 through the external storage medium, such as a memory card 28, etc. but also is supplied to the game apparatus 10 through a wired or a wireless communication line. In addition, the information processing program may be recorded in advance in a nonvolatile storage device inside the game apparatus 10. Additionally, as an information storage medium for storing the information processing program, an optical disk storage medium, such as a CD-ROM, a DVD or the like may be appropriate beyond the aforementioned nonvolatile storage device.

The wireless communication module 64 has a function of connecting to a wireless LAN according to an IEEE802.11.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and transmit data over the Internet with other appliances by means of the wireless communication module 64, and can receive and transmit data with the same types of other game apparatuses by means of the local communication module 66.

Furthermore, the CPU 50 is connected with the micon 68. The micon 68 includes a memory 68a and an RTC 68b. The memory 68a is a RAM, for example, and stores a program and data for a control by the micon 68. The RTC 68b counts a time. In the micon 68, date and a current time, etc. can be calculated on the basis of the time counted by the RTC 68b.

The micon 68 is connected with the power button 20f, the opening and closing switch 42, the power supply circuit 70, and the acceleration sensor 88. A power-on signal is given to the micon 68 from the power button 20f. When the power button 20f is turned on in a state that the main power supply of the game apparatus 10 is turned off, the memory 68a functioning as a BootROM of the micon 68 is activated to perform a power control in response to opening and closing of the game apparatus 10 as described above. On the other hand, when the power button 20f is turned on in a state that the main power supply of the game apparatus 10 is turned on, the micon 68 instructs the power supply circuit 70 to stop supplying power to all the circuit components (except for the micon 68). Here, the power supply circuit 70 controls the power supplied from the power supply (typically, a battery housed in the lower housing 14) of the game apparatus 10 to supply power to the respective circuit components of the game apparatus 10.

Furthermore, from the opening and closing switch 42, a power-on signal or a power-off signal is applied to the micon 68. In a case that the main power supply of the game apparatus 10 is turned on in a state that the opening and closing switch 42 is turned on (the main body of the game apparatus 10 is in an opened state), a mode in which a power is supplied from the power supply circuit 70 to all the circuit components of the game apparatus 10 under the control of the micon 68 (hereinafter referred to as "normal mode") is set. In the normal mode, the game apparatus 10 can execute an arbitrary application, and is in use (using state) by a user or a player (hereinafter referred to as "player").

Additionally, in a case that the opening and closing switch 42 is turned off in a state that the power supply of the game apparatus 10 is turned on (the main body of the game apparatus 10 is in a closed state), a mode in which a power is supplied from the power supply circuit 70 to a part of the components of the game apparatus 10 (hereinafter referred to as "sleep mode") is set. In the sleep mode, the game apparatus 10 cannot execute an arbitrary application, and is a state that the player is not in use (non using state). In this embodiment, the part of the components is the CPU 50, the wireless communication module 64, and the micon 68. Here, in the sleep mode (sleep state), the CPU 50 is basically in a state that a clock is stopped (inactivated), resulting in less power consumption. Additionally, in the sleep mode, a power supply to the CPU 50 may be stopped. Accordingly, as described above, in this embodiment, in the sleep mode, an application is never executed by the CPU 50.

It should be noted that in a case that a communication is executed by the wireless communication module 64 in the sleep state, the CPU 50 is activated by a control signal from the wireless communication module 64. That is, by the wireless communication module 64, the clock of the CPU 50 is operated, and then, the wireless communication module 64 instructs the CPU 50 to start a communication. This holds true hereunder. Then, the CPU 50 instructs the micon 68 to start supplying power to the memory controlling circuit 54 and the memory for saved data 56. Accordingly, it is possible to transmit data stored in the memory for saved data 56 to another game apparatus 10, etc. and store data received from another game apparatus 10, etc. in the memory for saved data 56, by a communication.

In addition, when the sleep state is cancelled (non-sleep state) due to the game apparatus 10 being opened, and so forth, a power-off signal is input to the micon 68 from the opening and closing switch 42. Thus, the micon 68 activates the CPU 50 to notify the CPU 50 of the cancellation of the sleep state. In response thereto, the CPU 50 instructs the micon 68 to cancel the sleep state. That is, under the instruction from the CPU 50, the micon 68 controls the power supply circuit 70 to start supplying power to all the circuit components. Thus, the game apparatus 10 makes a transition to the normal mode to enter the using state.

Moreover, as described above, the micon 68 is connected with the acceleration sensor 88. For example, the acceleration sensor 88 is a three-axis acceleration sensor, and provided inside the lower housing 14 (the upper housing 12 may be possible). This detects an acceleration in a direction vertical to the surface of the first LCD 16 (second LCD 18) of the game apparatus 10, and accelerations in two crosswise directions (longitudinal and laterally) that are parallel to the first LCD 16 (second LCD 18). The acceleration sensor 88 outputs a signal as to the detected acceleration (acceleration signal) to the micon 68. The micon 68 can detect a direction of the game apparatus 10, and a magnitude of the shake of the game apparatus 10 on the basis of the acceleration signal. Accordingly, it is possible to make the micon 68 and the acceleration sensor 88 function as a pedometer, for example. The pedometer using the acceleration sensor 88 is already known, and therefore, the detailed content is omitted, but the step counts are measured in correspondence with the magnitude of the acceleration.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.)

of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, the touch position data is data indicating coordinates of a position where an input is performed (touched position) on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where an input is made.

The operation button 20 is made up of the aforementioned respective operation buttons 20a-20k (except for the power switch 20f. This holds true hereunder) and is connected to the CPU 50. The operation data indicating an input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to instructions from the CPU 50, and output image data corresponding to the imaged images to the CPU 50. In this embodiment, the CPU 50 issues an imaging instruction to any one of the inward camera 32 and the outward camera 34 while the camera (32, 34) which has received the imaging instruction images an image and transmits the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and draws the same in the first VRAM 78. The second GPU 76 similarly generates a second display image according to an instruction from the CPU 50, and draws the same in the second VRAM 80. The first VRAM 78 and the second VRAM 80 are connected to the LCD controller 82. The LCD controller 82 includes a register 82a. The register 82a stores a value of "0" or "1" according to an instruction from the CPU 50. In a case that the value of the register 82a is "0", the LCD controller 82 outputs the first display image drawn in the first VRAM 78 to the second LCD 18, and outputs the second display image drawn in the second VRAM 80 to the first LCD 16. Furthermore, in a case that the value of the register 82a is "1", the LCD controller 82 outputs the first display image drawn in the first VRAM 78 to the first LCD 16, and outputs the second display image drawn in the second VRAM 80 to the second LCD 18.

For example, such a game apparatus 10 executes in-passing communication processing when being set to the sleep mode. Here, the in-passing communication processing is briefly explained. In the sleep mode, the wireless communication module 64 transmits (broadcasts) a signal (connection request signal) indicating a connection request to another game apparatus 10, and tries to receive a connection request signal from another game apparatus 10 each predetermined time (30 ms, for example). That is, communication processing is intermittently executed. Thus, another game apparatus 10 being a communication partner is searched (scanned). Here, the connection request signal includes identifying information of the game apparatus 10 being a transmission source.

At this time, when receiving the connection request signal, the game apparatus 10 transmits a connection permission signal to the game apparatus 10 being a transmission source of the connection request signal in response thereto. Here, the connection permission signal includes identifying information of the game apparatus 10 being a transmission source. This makes it possible to confirm each other's existences between the two game apparatuses 10 to thereby establish a communication state between them.

Here, in the game apparatus 10 that transmits the connection permission signal in response to the connection request signal, the wireless communication module 64 activates the CPU 50 to start supplying electric power from the power supply circuit 70 to the memory controlling circuit 54 and the memory for saved data 56 under the control of the micon 68 according to an instruction from the CPU 50. Similarly, in the game apparatus 10 which receives the connection permission signal, the wireless communication module 64 activates the CPU 50 to start supplying electric power from the power supply circuit 70 to the memory controlling circuit 54 and the memory for saved data 56 under the control of the micon 68 according to an instruction from the CPU 50.

When a communication state is established, data set (decided) in advance, such as game data, message data, etc. is transmitted or received, or transmitted and received between the two game apparatuses 10.

Although the detailed description is omitted, when the in-passing communication is ended, each game apparatus 10 returns to the sleep state.

Accordingly, when the player walks with the game apparatus 10 in the sleep state, a communication (in-passing communication) with another game apparatus 10 is executed without any operation to thereby acquire data, such as game data, message data from the other game apparatus 10. It should be noted that an in-passing communication may be made while the power of the game apparatus is turned on as well.

Here, a case that the in-passing communication processing with another game apparatus 10 is executed is described, but the in-passing communication processing may be executed with a predetermined access point. In such a case, game data, message data, etc. that are transmitted from the access point can be acquired.

Although the detailed description is omitted, in a case that in-passing communication is executed, out of the two game apparatuses 10 that establish the connection state, the game apparatus 10 that transmits a connection request signal functions as a parent machine, and the game apparatus 10 that transmits a connection permission signal in response to the connection request signal functions as a child machine.

Furthermore, as described above, in the sleep mode, the game apparatus 10 functions as a pedometer, and in a case that the player walks with the game apparatus 10, the number of step counts of the player is counted. The counted step count is reflected on the processing of the information processing program, such as a game program, etc. to be executed by the game apparatus 10 as necessary.

In this embodiment, the game apparatus 10 executes a shooting game. For example, the shooting game is a game in which a player character moves and performs a shooting action according to an operation by the player, and shoots and defeats an enemy character. In this shooting game, a plurality of stages are prepared, and when the player clears one stage, he or she advances to a next stage. In each stage, a start point and a goal point (or a condition for clear, such as defeating a boss character, for example) within a game field provided to the virtual space are set. Then, if the player can move the player character from the start point to the goal point (or can achieve the condition for clear, such as defeating the boss character) by performing a character moving operation, the stage is cleared.

Figure 4:
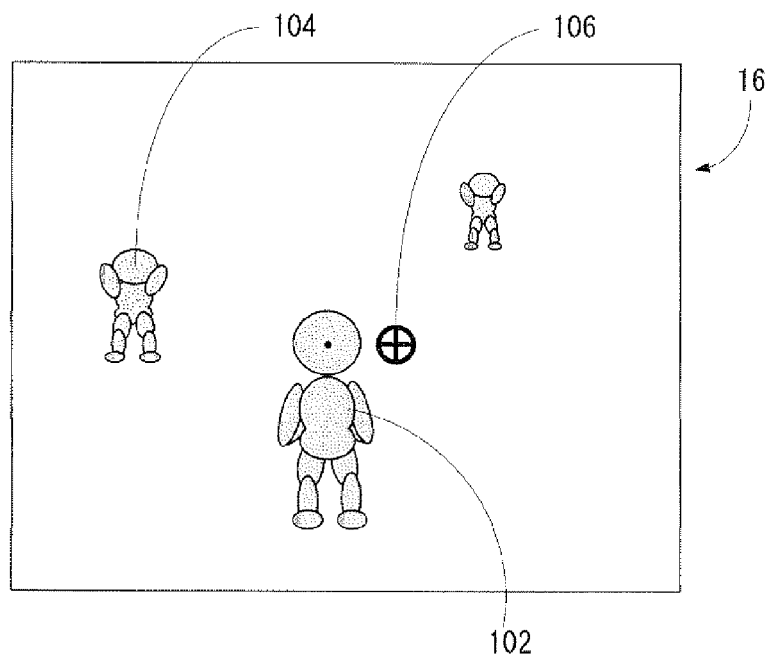
FIG. 4 is an illustrative view showing an example of a game screen and a transmission setting screen to be displayed on the LCDs of the game apparatus shown in FIG. 1.
Figure 4:
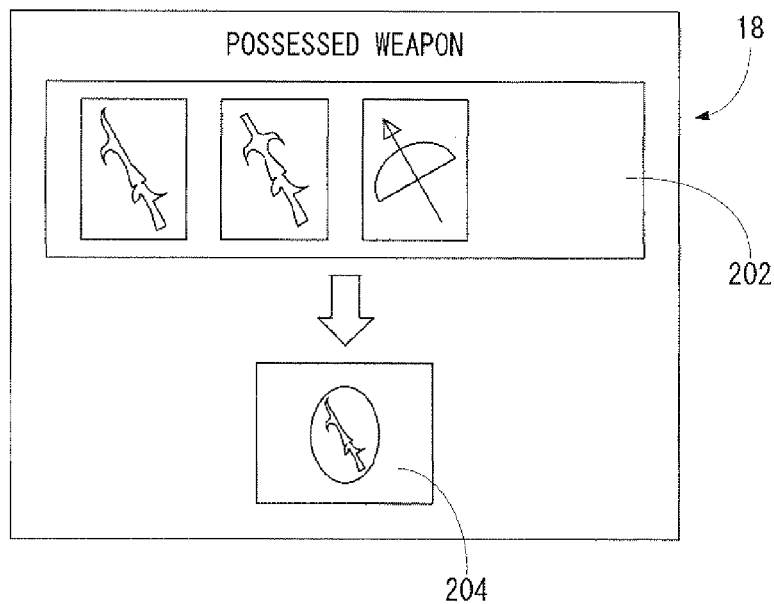

FIG. 4 is an illustrative view showing one example of a game screen 100 of the shooting game of this embodiment. Although detailed description and illustration are omitted, before the program of the shooting game of this embodiment is activated and the game play is started, that is, before the main part of the game is started, a stage which is to be currently played is chosen (by the user or automatically) out of the plurality of stages, and then, the difficulty level of the game is chosen to display the game screen 100 as shown in FIG. 4 on the first LCD 16.

Although a detailed description is omitted, the difficulty level of the game can be increased or decreased from the initial value by using the coins (possessed coin) possessed by the player character.

When the difficulty level of the game is increased, the probability (possibility) of obtaining an item (including weapons) becomes high. Furthermore, by defeating the enemy character, the number of coins obtainable by the player character is increased. In addition, the value of an allowable range (capacity) as to a performance parameter set to a weapons possessed by the player character is made large. Also, the parameter (attack power, defense power, etc.) of the enemy character becomes high, and the number of enemy characters is large, for example.

On the other hand, when the difficulty level of the game is decreased, the probability of obtaining an item is made low. Furthermore, by defeating the enemy character, the number of coins obtainable by the player character is reduced. In addition, the value of the capacity is made small. Furthermore, the parameter (attack power and defense power, etc.) of the enemy character becomes low, and the number of enemy characters is low, and the enemy character ceases attacking the player character, for example.

On the game screen 100, a player character 102 is displayed, and one or a plurality of enemy characters 104 are displayed on the game field (game map). Here, the enemy character 104 may not be always necessary to be displayed, and may be displayed (appear) according to a predetermined game event such as an approach of the player character 102, etc.

Additionally, on the game screen 100, background objects, such as trees, buildings, floors, ground, etc. are also displayed.

Furthermore, as described above, when game playing is started in each stage, the difficulty level is set, so that the game data to be used is decided depending on the set difficulty level, and treasure chests containing items (including weapons) are arranged in the game field based on the frequency of appearance depending on the difficulty level.

As described above, the shooting game of this embodiment is a game in which the player character 102 moves and performs a shooting action, and shots and defeats the enemy character 104, according to an operation by the player. When the player character 102 succeeds in attacking the enemy character 104, that is, it defeats the enemy character 104, a predetermined number of coins are obtained. The obtained coins are possessed by the player character 102. Furthermore, at this time, the player character 102 obtains an experience point of a predetermined value. The player character 102 buys items, stays, and has a meal by using the possessed coin. When the player character 102 buys the items, stays and has a meal, the possessed coins are subtracted by a necessary count.

Accordingly, the player character 102 is increased in the attack power by equipping high-performance weapons, for example. Furthermore, the player character 102 recovers the physical strength or the life through the meals and stays. Here, the item is sometimes in the treasure chest obtainable in the game field, and is not necessarily bought.

Furthermore, the player character 102 is increased in the ability value as the experience point is increased. The ability value is set in steps depending on the level of the player character 102. The level is raised when the accumulated experience point becomes a predetermined value. Here, to each level, the maximum value as to the experience point is set in advance. For example, the player character 102 obtains the experience point by defeating the enemy character 104. The obtained experience point is accumulated, and when the accumulated experience point is equal to or more than the maximum value of the experience point at the current level, the level of the player character 102 is raised by one. This raises the ability value of the player character 102. For example, the ability value is a value set to each ability, such as a moving velocity, a quickness of an attack, a hit probability of an attack, a shooting range (distance) of attack, a defense power, etc.

Additionally, the player can shoot and defeat the enemy character 104 and evades an attack from the enemy character 104 by performing a moving operation of the player character 102 and a shooting action instructing operation with the use of the various buttons 20. The shooting direction is decided on the basis of the position of a gun sight 106. More specifically, the shooting direction is a direction from the position of the player character 102 to the position of the gun sight 106, and a bullet object not shown is fired to fly toward this direction. Then, when the bullet object hits the enemy character 104, the attack power of the player character 102 and the defense power of the enemy character 104 are compared with each other, and the life of the enemy character 104 is reduced in correspondence with the comparison result. When the life becomes 0, the enemy character 104 disappears. When the life of the enemy character 104 becomes 0 to make it disappear, this is considered as a success in the game, and the coins and the experience point are obtained.

Here, as a modified example, when the bullet object and the enemy character 104 hit with each other (even if the life of the enemy character 104 does not become 0), this is considered as a success in the game, and the coins and the experience point may be obtained.

Additionally, the enemy character 104 also performs a shooting action on the player character 102, and when the bullet object hits the player character 102 by the shooting action, the defense power of the player character 102 and the attack power of this enemy character 104 are compared with each other. Then, the life of the player character 102 is reduced in correspondence with the comparison result. When the life becomes 0, the game is over.

Furthermore, in this embodiment, when one player character 102 is made to disappear, the game is immediately over, but when all of the plurality of player characters 102 are made to disappear, the game may be over. Alternatively, in another virtual game, when the time limit expires before the final goal or the interim goal is attained, the game may be over.

Also, in the shooting game of this embodiment, from the weapons possessed by the player, the player is made to choose a desired weapon, generates a seed from the chosen weapon, sets data as to the seed (seed data) to an object to be transmitted, and transmits and receives (exchanges) the seed data with other game apparatuses 10. In this embodiment, when a transmission setting of a weapon is instructed by the player, a transmission setting screen 200 as shown in FIG. 4(B) is displayed on the second. LCD 18. Here, the weapons possessed by the player character 102 are displayed in a display region 202 at the upper part of the screen. Here, each of the weapons is a weapon which is bought, is obtained from the found treasure chest, and is generated by fusing (combining) seeds by the player character 102. That is, all the weapons obtained by playing the shooting game with the game apparatus 10 are displayed. Additionally, as described later, a weapon (communication-originated weapon) generated by fusing two seeds received from other game apparatuses 10, etc. is also displayed on the display region 202. That is, a seed generated from a communication-originated weapon again can be transmitted to other game apparatuses 10, etc.

Here, the seed can be obtained through communications, and can also be obtained from the found treasure chest.

When the player chooses one weapon to be transmitted on the transmission setting screen 200, data of the seed (seed data) is generated from the data of the chosen weapon. Although illustration is omitted, the kind of the seed generated is decided in advance in correspondence with each weapon according to a table, and by reference to the table, the seed data is generated from the weapon data. The generated seed is displayed in a display region 204 at the lower part of the screen. Furthermore, the seed data (transmission objective seed data 564a) as to the generated seed is stored in the memory for saved data 56 (see FIG. 10(B)). Here, the transmission objective seed data is identification data indicating the kind of the seed. At this time, the weapon (weapon chosen as an object to be transmitted) from which the seed is generated is set to an unusable state in the game playing. That is, the weapon is set to a state that the player character 102 cannot equip it. Accordingly, the player has to play the game while conceiving tactics as to whether he or she generates a seed from the weapon and sets it to an object to be transmitted, or he or she equips the player character 102 with the weapon. Thus, it is possible to increase interest of the game.

Here, the weapon (weapon chosen as an object to be transmitted) from which the seed is generated may continuously be used in the game playing as it is.

Furthermore, when a seed is generated from a weapon, no coin is consumed, and no condition as to the level of the player character is provided.

In this embodiment, the seed data, that is, the transmission objective seed data 564a is transmitted and received in the above-described in-passing communication processing. However, a copy of the transmission objective seed data 564a is actually transmitted. That is, the transmission objective seed data 564a is not deleted from the game apparatus 10 being the transmission source after being transmitted and thus can be transmitted any number of times. Accordingly, the in-passing communication processing can be performed with other game apparatuses 10.

Also, it is also possible to cancel the transmission as to the seed which is set as an object to be transmitted. Although illustration is omitted, when there is an instruction of canceling the transmission about the seed which is set as an object to be transmitted by the player, a transmission canceling screen is displayed on the second LCD 18. For example, on the transmission canceling screen, a message inquiring whether the transmission setting of the seed is cancelled to make the weapon being the original of the seed useable or not is displayed, and two button images for choosing whether to execute or not to execute the cancellation are provided. When execution of the cancel is chosen, the transmission objective seed data 564a is deleted from the memory for saved data 56. At this time, the weapon being the original of the seed is set to a useable state. That is, the player character 102 is set to be capable of being equipped with the weapon. Here, the weapon being the original of the seed may be equipped by the player character 102 as it is. That is, this may be set to a using state.

Figure 5:
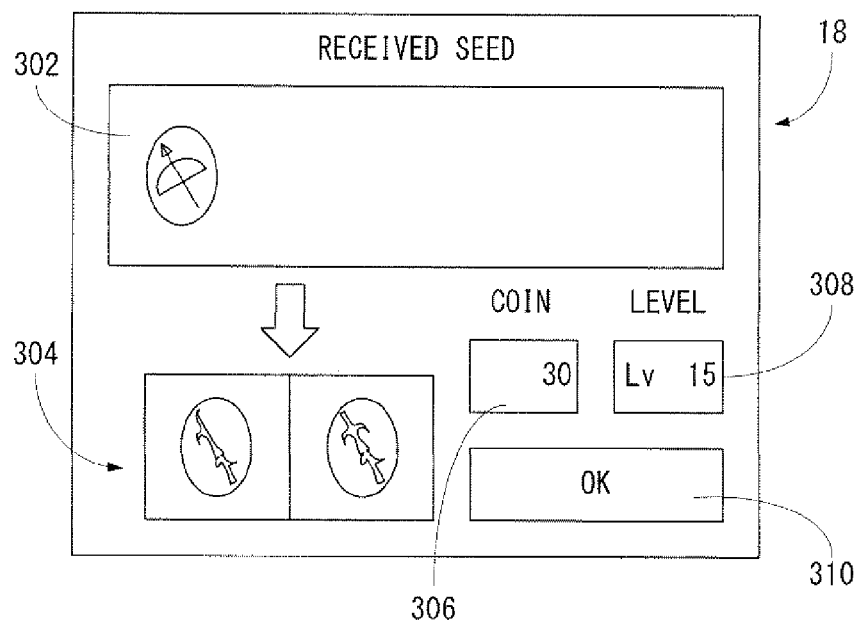
FIG. 5 is an illustrative view showing one example of a fusion setting screen and a generation result screen to be displayed on the LCDs of the game apparatus shown in FIG. 1.
Figure 5:
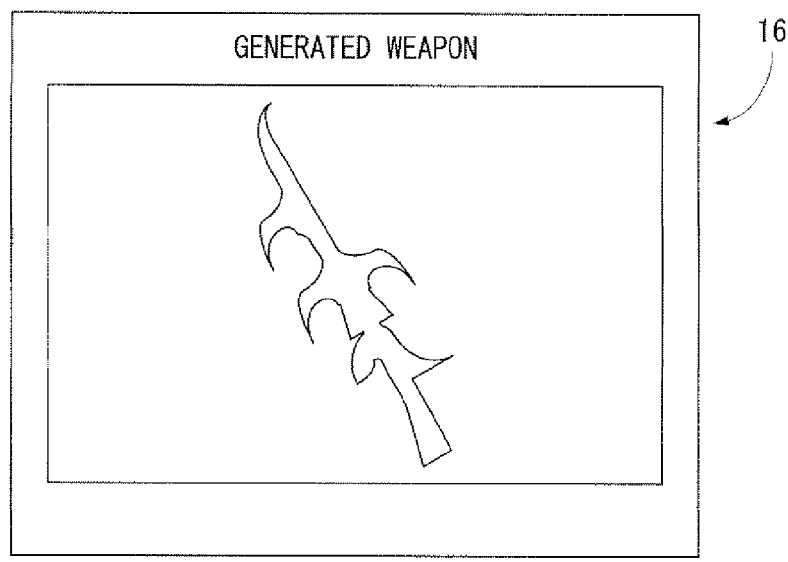

In the game apparatus 10, the two seeds corresponding to the received (obtained through an exchange) seed data (communication-originated seed data) are fused to thereby generate a weapon. Here, a predetermined number of coins are required for generating a weapon. When fusing seeds (generating a weapon) is instructed, a fusion setting screen 300 as shown in FIG. 5(A) is displayed on the second LCD 18. All the received seeds are displayed in a display region 302 at the upper part of the screen. According to an operation by the player, two seeds to be fused are chosen. The chosen two seeds are displayed in a display region 304 at the lower part of the screen. At this time, the number of coins to be used for fusion (generation of a weapon) is displayed in a display region 306. Also, a numerical value as to the level of the player character 102 necessary for fusion is displayed in a display region 308. In addition, on the fusion setting screen 300, a button image 310 is displayed, and when this is turned on, generation of a weapon is started.

Although illustration is omitted, in a case that the number of possessed coins is less than the number of coins to be used, or in a case that the level of the player character 102 is less than the necessary level (displayed level), the button image 310 is grayed out so as not to be turned on. That is, it is impossible to generate a weapon.

In this embodiment, combinations between two seeds capable of being fused are decided in advance, and weapons generated from them are also decided in advance. For example, a fusion table as shown in FIG. 6 is prepared in advance. On the fusion table, a seed 1, a seed 2, a weapon, the number of coins required for fusion, and the level of the player character required for fusion are described. Here, for simplicity, the seed is classified as 4 kinds each of which is indicated by alphabetic characters. For example, the seed A and the seed A are fused to generate a weapon 1. At this time, 10 coins are used. Also, the level of the player character 102 is required to be equal to or more than 1. Alternatively, the seed B and the seed D are fused to generate a weapon 7. At this time, 30 coins are used. Also, the level of the player character 102 is required to be equal to or more than 15.

Here, in this embodiment, the seed 1 and the seed 2 are described so as to be discriminated from each other, but correctness of the combination between the two seeds is only necessary, and the order aligned in the display region 304 of the fusion setting screen 300 is especially not important.

For example, in a case that a seed generated from a gun with a short shooting range and a high power and a seed generated from a gun with a long shooting range and a low power are fused, a gun with a middle shooting range and a power of medium degree is generated. Also, in a case that a seed generated from a gun and a seed generated from a magic stick are fused, a weapon capable of firing and using magic is generated.

Figure 7:
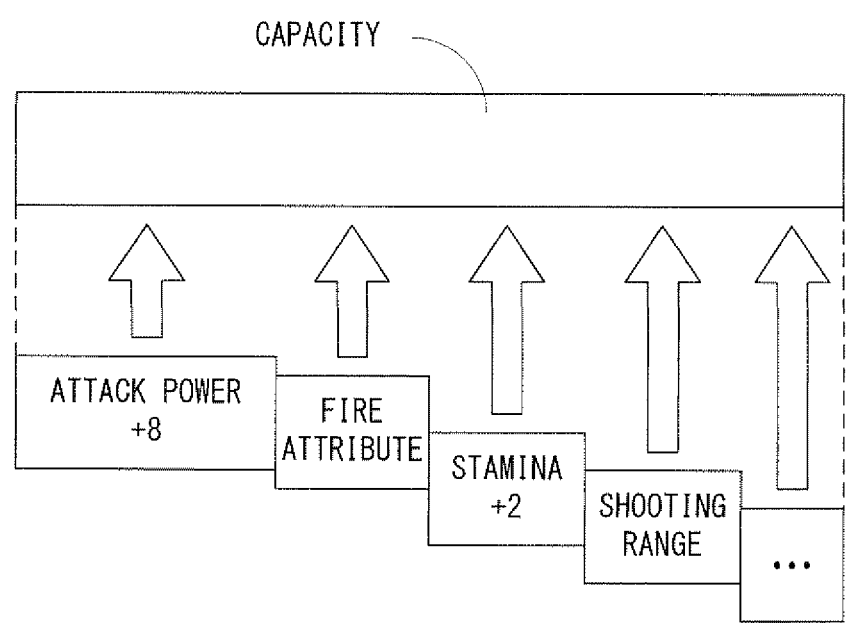
FIG. 7 is an illustrative view for describing capacity and a performance parameter set to a weapon possessed by a player character.

When the weapon is generated, a generation result screen 400 as shown in FIG. 5(B) is displayed on the first LCD 16. On the generation result screen 400, the generated weapon is displayed at the center of the screen. Furthermore, when a weapon is generated, a performance parameter as to the weapon is decided. As shown in FIG. 7, the performance parameter is randomly decided within an allowable range (capacity) decided in correspondence with elements concerning the shooting game. For example, the elements concerning the game are the difficulty level of the game, the degree of progress of the game (the number of cleared stages or current stage), the number of obtained weapons, the total playing time, the level, etc. Here, a random number is multiplied by the capacity such that the capacity is not decided as the same value every time that the weapon is obtained. Furthermore, the elements concerning the game are exemplary only, and a further element may be added, and some elements may be deleted.

The capacity is a container for cramming elements such as each performance parameter decided as to the weapon, and is crammed in order of the performance parameter which has a high ratio of changing the performance of the weapon as shown in FIG. 7. It should be noted that in a case that the value of the capacity (maximum value) is exceeded, the performance parameters which are off the capacity are deleted. Furthermore, if all the performance parameters are crammed in the capacity to have a remainder, the remainder is rounded off.

Additionally, the performance parameter is a parameter for changing (increasing or decreasing) the performance of the weapon, and includes an attack power, stamina, a shooting range, an attribute value, etc. The attack power is greatness of the damage given to the enemy character 104. The stamina is greatness of the power for reducing the damage of the attack at a defense of the attack by the enemy character 104. The shooting range is a range where the attack power reaches. The attribute value is a value as to the attribute of the weapon (water attribute, fire attribute, for example). Here, the attribute is arbitrary set by developers and programmers of the game. The values of the performance parameter are decided at random when the weapon is generated. Here, in correspondence with the level of the player at a time when the weapon is generated, the upper limit of the performance parameter is changed.

Although a detailed, description is omitted, the capacity and the performance parameter are decided when a weapon is bought, when a weapon appears from the treasure chest, or when seeds obtained from the treasure chests are fused to generate a weapon as well.

Additionally, in FIG. 5(A), a case that received two seeds are fused is explained, but seeds obtained from treasure chests can also be fused. The seed in the treasure chest is data (local-originated seed data) corresponding to the seed to be obtained within the game field of the shooting game. That is, it is possible to fuse the seeds corresponding to the local-originated seed data. Although a detailed description is omitted, in a case that two seeds obtained within the game field are fused, a fusion setting screen 300 as shown in FIG. 5(A) is displayed on the second LCD 18. Here, in the display region 302, the seed corresponding to the local-originated seed data is displayed. A method of the fusion and generation of a weapon are the same as those when the seeds corresponding to the communication-originated seed data are fused, and thus, a redundant description is omitted.

Although a detailed description is omitted, in this embodiment, the seed corresponding to the communication-originated seed data and the seed corresponding to the local-originated seed data cannot be fused with each other, but they may be adapted to be fused.

Figure 8:
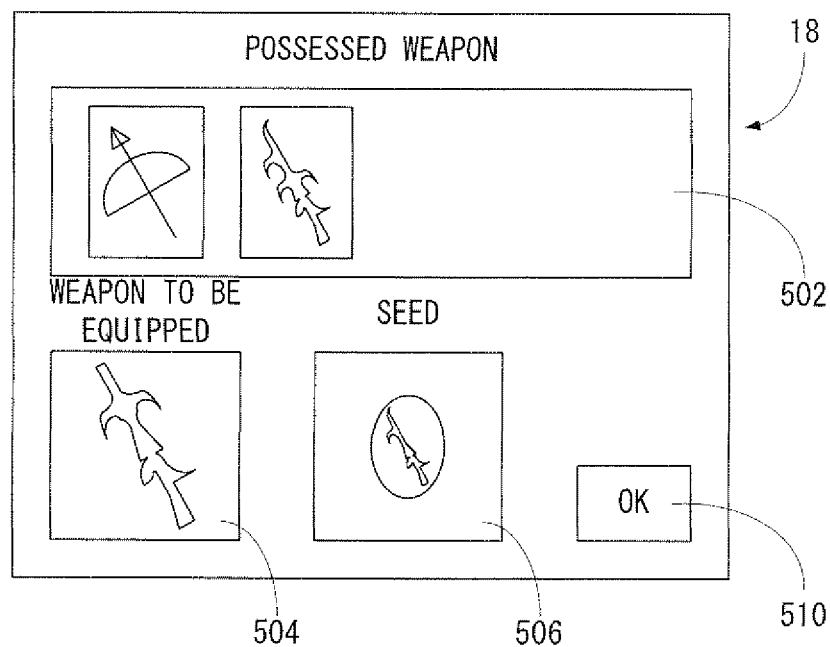
FIG. 8 is an illustrative view showing an equipment setting screen to be displayed on the LCD of the game apparatus shown in FIG. 1.

Also, when an equipment setting instruction is issued from the player, an equipment setting screen 500 is displayed on the second. LCD 18 as shown in FIG. 8. On the equipment setting screen 500, weapons possessed by the player character 102 are displayed in a display region 502 at the upper part of the screen. That is, a list of weapons is displayed. Furthermore, the weapon which is currently equipped is displayed in a display region 504 at the lower left of the screen. In addition, in a case that a seed is generated from the weapon, the seed is displayed in the display region 506 at the lower center of the screen.

Here, when one weapon is chosen from the weapons displayed in the display region 502, the chosen weapon is displayed in the display region 504. At this time, the weapon which has been displayed on the display region 504 up until before is displayed (moved to) in the display region 502. That is, the equipment is switched. As understood from FIG. 8 also, an image of the weapon from which the seed is generated is not displayed in the display region 502, and thus, it cannot be chosen as equipment. Although illustration is omitted, as described above, in a case that a transmission setting of the seed is cancelled, nothing is displayed in the display region 506, and all the weapons possessed by the player character 102 are displayed in the display region 502 (and display region 504).

Also, on the equipment setting screen 500, a button image 510 is displayed at the right lower part of the screen. The button image 510 is provided for setting (deciding) the equipment of the player character 102. When the button image 510 is turned on in a state that a weapon is displayed in the display region 504, the weapon is set as an equipment of the player character 102. Here, when the button image 510 is turned on in a state that no weapon is displayed in the display region 504, the player character 102 is set to have no weapon.

Thus, according to an operation by the player, the player character 102 can be set to have a weapon, switch a weapon, and not to have a weapon. Although a detailed description is omitted, the capacity and the performance parameter are set to the weapon, and thus, when the weapon to be equipped is switched, the attack power parameter, etc. are changed.

Figure 9:
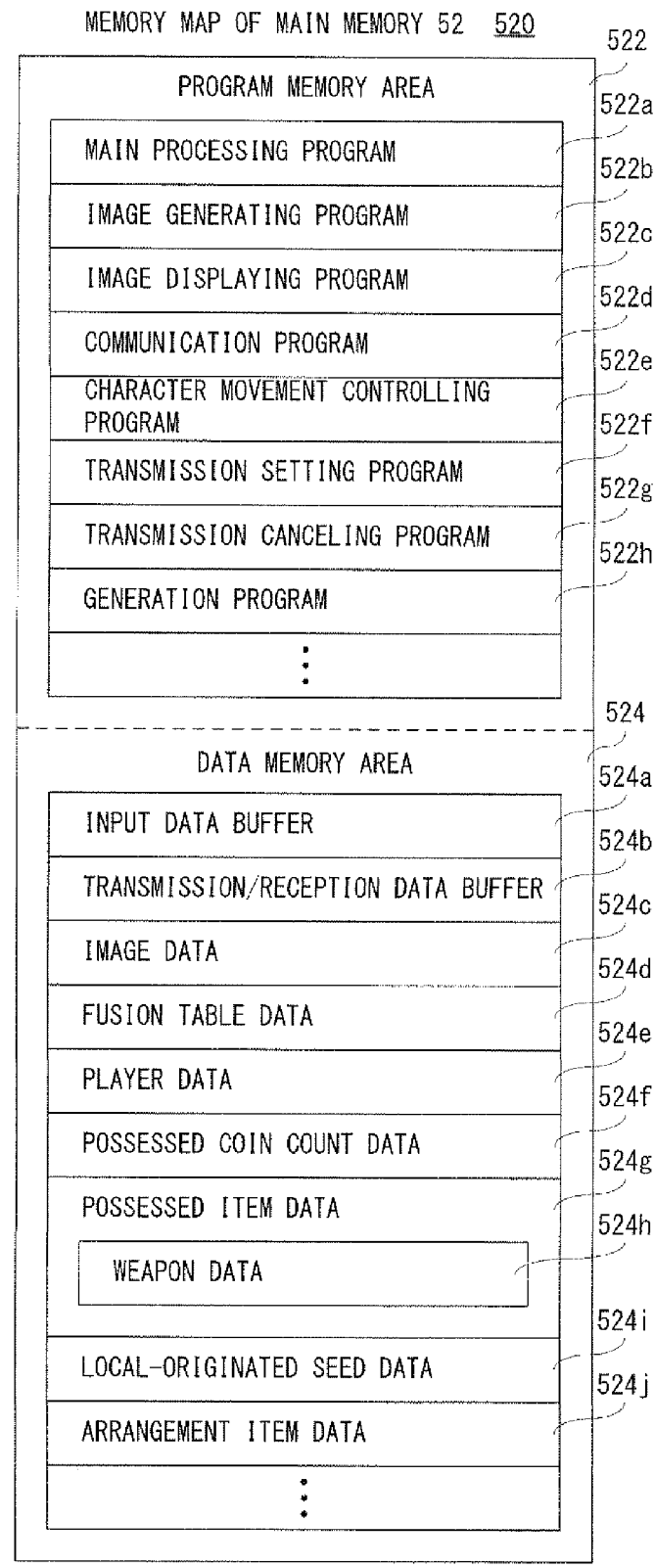
FIG. 9 is an illustrative view showing a memory map of a main memory shown in FIG. 3.

FIG. 9 shows a memory map 520 of a main memory 52 shown in FIG. 3. As shown in FIG. 9, the main memory 52 includes a program memory area 522 and a data memory area 524. The program memory area 522 stores a game program, and the game program is made up of a main processing program 522a, an image generating program 522b, an image displaying program 522c, a communication program 522d, a character movement controlling program 522e, a transmission setting program 522f, a transmission canceling program 522g and a generation program 522h, etc. These programs are stored in advance in the nonvolatile memory within the memory card 26 or the memory for saved data 56, and are loaded into the main memory 52 when activating a program is instructed.

The main processing program 522a is a program for processing a main routine of the game (shooting game) of this embodiment. The image generating program 522b generates game image data for displaying screens (100, 200, 300, 400, 500, etc.) by using the image data 524c described later. At a start of the game, the player character 102 and the enemy character 104 are arranged at initial positions, and treasure chests are also arranged at predetermined positions. The image displaying program 522c displays the game image data generated according to the image generating program 522b as screens on the first LCD 16 or the second LCD 18, or on the both of them.

The communication program 522d is a program for making communications with other game apparatuses 10 and computers or access points. The character movement controlling program 522e is a program for controlling the player character 102 and the enemy character 104. Briefly speaking, the character movement controlling program 522e moves the player character 102, and makes the player character 102 perform an arbitrary action (attack, etc.) according to an operation by the player. Furthermore, the character movement controlling program 522e makes the enemy character 104 appear, makes the enemy character 104 move, and makes the enemy character 104 perform a predetermined action (attack, evade, etc.) irrespective of an operation by the player.

The transmission setting program 522f is a program for generating a seed from a weapon chosen according to an instruction by the player, setting the generated seed to an object to be transmitted, and setting the weapon from which this seed is generated to be unusable state. The transmission canceling program 522g is a program for excluding a seed from an object to be transmitted according to an instruction from the player, and setting the weapon from which this seed is generated to a useable state. The generation program 522h is a program for fusing chosen two seeds to generate a weapon.

Although illustration is omitted, in the game program, a sound outputting program, a backup program, etc. are included. The sound outputting program is a program for outputting a sound necessary for the game, such as voices or onomatopoeic sounds of characters, a sound effect, and music (BGM) by using sound data not shown. The backup program is a program for storing (saving) game data (proceeding data, result data) in the memory cards 26, 28 and the memory for saved data 56 according to an instruction from the player and a predetermined event.

Also, in the data memory area 524, an input data buffer 524a and a transmission/reception data buffer 524b are provided. The input data buffer 524a stores (temporarily stores) operation data input from the operation button 20 and touch position data input from the touch panel 22 in chronological order. The operation data and the touch position data are deleted from the operation data buffer 524a when they are used in the game processing. The transmission/reception data buffer 524b stores (temporarily stores) data to be transmitted (game data and message data) and received data when communications (except for an in-passing communication) with other game apparatuses 10, etc. are executed in the normal mode.

Furthermore, in the data memory area 524, image data 524c, fusion table data 524d, player data 524e, possessed coin count data 524f, possessed item data 524g, weapon data 524h, local-originated seed data 524i, arrangement item data 524j, etc. are stored.

The image data 524c is data for generating game image data, such as polygon data, texture data, etc. The fusion table data 524d is data as to the fusion table shown in FIG. 6. The fusion table data 524d is stored in the nonvolatile memory within the memory card 26 or the memory for saved data 56 in advance, and loaded into the main memory 52 when an activation of the program is instructed similar to the aforementioned program.

The player data 524e includes numerical value data (level data) indicating the level of the player character 102, numerical value data (experience point data) as to the experience point, and numerical value data (ability value data) as to the ability value.

The possessed coin count data 524f is numerical value data as to the number of coins possessed by the player character 102. The possessed item data 524g is data of the item possessed by the player character 102 (item identification number data and attribute value data).

Figure 10:
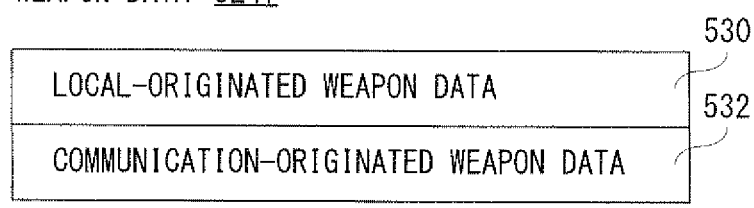
FIG. 10 is an illustrative view showing a detail of weapon data shown in FIG. 9 and an example of a memory map of a memory for saved data showing in FIG. 3.
Figure 10:
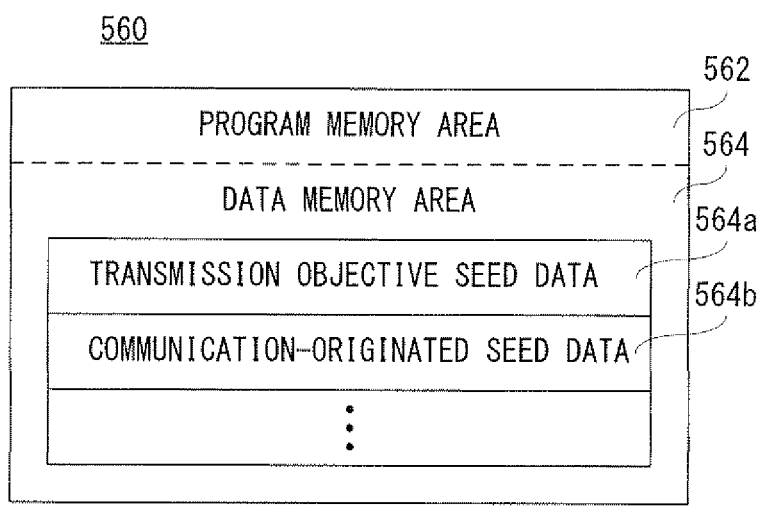

The weapon data 524h is data as to the weapon possessed by the player character 102, and included in the possessed item data 524g. As shown in FIG. 10(A), the weapon data 524h includes local-originated weapon data 530 and communication-originated weapon data 532. The local-originated weapon data 530 is data (item identification number data and attribute value data) as to a weapon which is bought by the player character 102 in the game field, is in a treasure chest obtained in the game field, and is generated by fusing the seeds obtained in the game field. Also, the communication-originated weapon data 532 is data (item identification number data and attribute value data) as to a weapon generated by fusing seeds received from other game apparatuses 10, etc. Here, the attribute value data is data of a flag (usability flag) for determining whether or not the weapon can be equipped (useable), a flag (in-use flag) for determining whether a weapon is equipped, and numerical value data as to a value of the capacity and a value of each performance parameter. For example, when a weapon is obtained, the usability flag is set to be turned on (this weapon is in a useable state). When a weapon is set to an object to be transmitted (in a case that the weapon becomes a seed), the usability flag is turned off. When the weapon is excluded from the object to be transmitted (is restored from the seed to the weapon), the usability flag is turned on again. Also, in a case that a weapon is equipped by the player character 102, the in-use flag is turned on. On the other hand, in a case that a weapon is not equipped with the player character 102, the in-use flag is set to be off. The local-originated seed data 524i is data as to the seed obtained by the player character 102 in the game field.

The player data 524e, the possessed coin count data 524f, the possessed item data 524g (including the weapon data 524h), and the local-originated seed data 524i are saved and stored in the nonvolatile memory within the memory card 26 which is rewritable or the memory for saved data 56 when the game playing is to be ended, and are loaded into the main memory 52 when activation of the program is instructed.

The arrangement item data 524j is image data of each item to be used in the virtual game, parameter data like an attack power, etc., data defining an appearing stage and data of an arrangement position, and further sets a flag for determining whether or not each item is to be arranged (is made to appear). The data as to all the items appearing in the virtual game are stored in advance in the nonvolatile memory within the memory card 26 or the memory for saved data 56, and when game playing in each stage is started, the item data appearing in this stage is loaded in the main memory 52 as arrangement item data 524j.

Although illustration is omitted, in the data memory area 524, other image data (image data of items and seeds, etc.) and sound data, etc. are stored, and flags and counters (timers) necessary for the processing of the virtual game are set.

FIG. 10(B) is an illustrative view showing a memory map 560 of the memory for saved data 56 shown in FIG. 3. As shown in FIG. 10(B), the memory for saved data 56 includes a program memory area 562 and a data memory area 564. In the program memory area 562, an application program such as a game program, etc. is installed (stored). In the data memory area 564, transmission objective seed data 564a, communication-originated seed data 564b, etc. are stored. The transmission objective seed data 564a is data as to the seed generated according to the transmission setting program 522f, and transmitted to other game apparatuses 10, etc. by the in-passing communication. The communication-originated seed data 564b is data as to the seed received from other game apparatuses 10, etc. by the in-passing communication.

Figure 11:
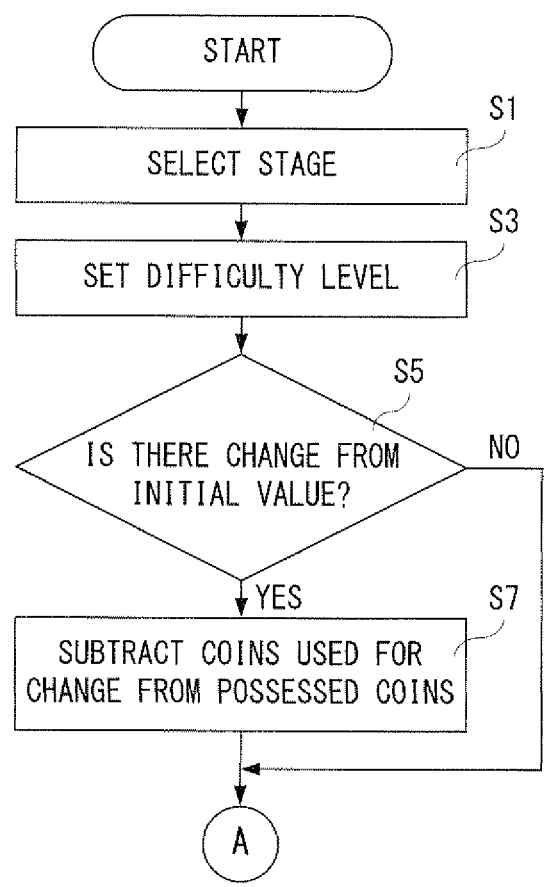
FIG. 11 is a flowchart showing a first part of game entire processing by a CPU shown in FIG. 3.

FIG. 11 to FIG. 18 are flowcharts showing game entire processing of the shooting game of this embodiment. As shown in FIG. 11, when starting the game entire processing, the CPU 50 executes playing stage choosing processing in a step S1. When the game is played for the first time, a stage 1 (first stage) is automatically chosen. Here, one stage can be chosen from a plurality of stages. After clearing each stage, the player can choose the cleared stage if he or she desires.

In a next step S3, setting processing of the difficulty level of the game is executed. The difficulty level of the game is set to an initial value, and is increased and decreased according to an operation by the player. That is, the difficulty level of the game is sometimes changed from the initial value. In a step S5, it is determined whether or not the difficulty level of the game is changed from the initial value.

Figure 12:
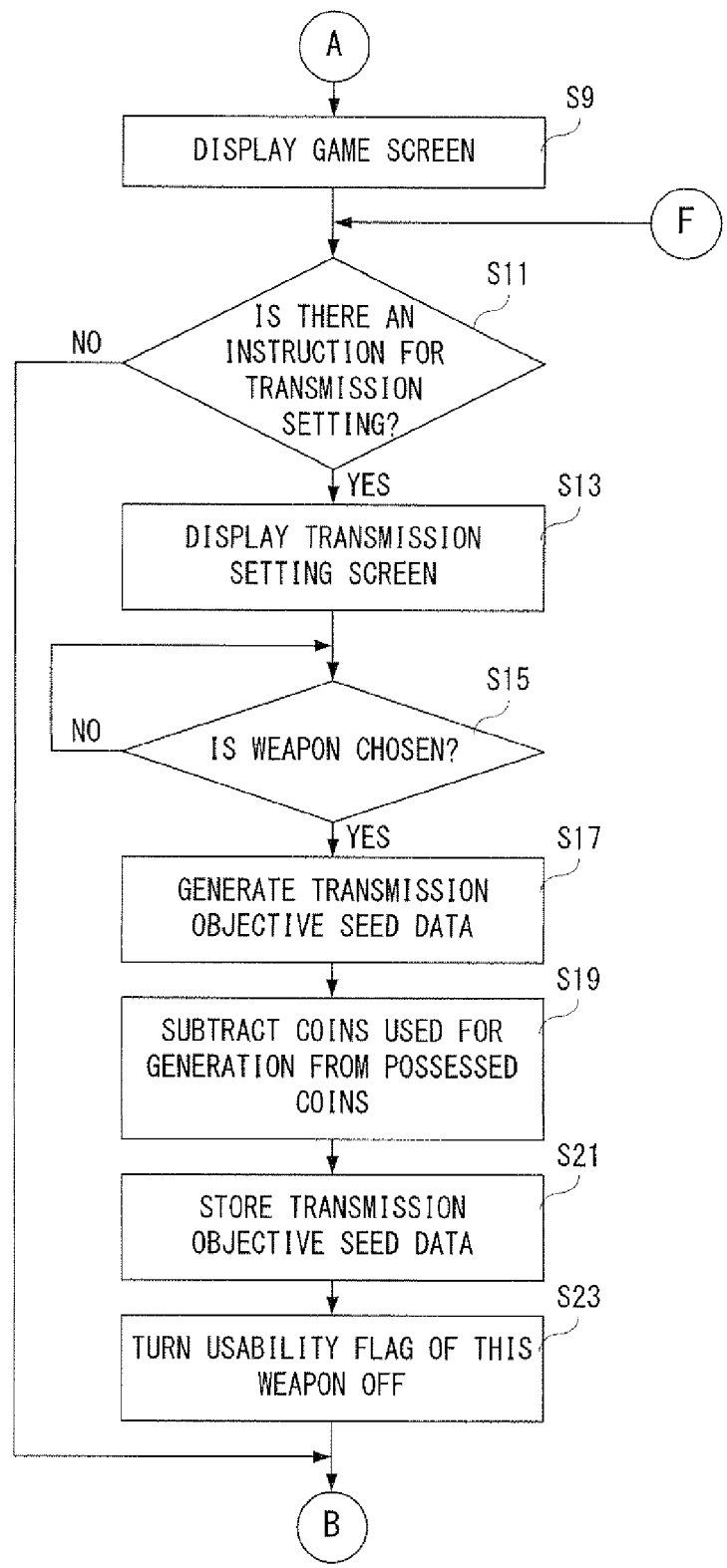
FIG. 12 is a flowchart showing a second part of the game entire processing by the CPU shown in FIG. 3 and being sequel to FIG. 11.

If "NO" in the step S5, that is, if the difficulty level of the game is not changed from the initial value, the process proceeds to a step S9 shown in FIG. 12 as it is. On the other hand, if "YES" in the step S5, that is, if the difficulty level of the game is changed from the initial value, coins used for the change is subtracted from the possessed coins in a step S7, and the process proceeds to the step S9. That is, in the step S7, the number of coins used for changing the difficulty level is subtracted from the number of possessed coins indicated by the possessed coin count data 524f, and the possessed coin count data 524f is updated.

As shown in FIG. 12, in the step S9, the game screen 100 as shown in FIG. 4(A) is displayed on the first LCD 16. Here, the CPU 50 arranges items which are defined to appear in the stage where the player will play from now out of the items defined by the arrangement item data 524j in the stage. Also, the CPU 50 arranges the player character 102 and the enemy character 104 at initial positions.

In a succeeding step S11, it is determined whether or not there is an instruction for transmission setting. If "NO" in the step S11, that is, if there is no instruction for transmission setting, the process proceeds to a step S25 shown in FIG. 13 as it is. On the other hand, if "YES" in the step S11, that is, if there is an instruction for transmission setting, the transmission setting screen 200 as shown in FIG. 4(B) is displayed on the second LCD 18 in a step S13. More specifically, in the step S13, with reference to the possessed item data 524g, a list of weapons corresponding to the weapon data 524h is displayed.

In a next step S15, it is determined whether or not a weapon is chosen from the list of weapons by the player. If "NO" in the step S15, that is, if a weapon is not chosen, the process returns to the same step S15. On the other hand, if "YES" in the step S15, that is, if a weapon is chosen, the transmission objective seed data 564a is generated in a step S17. That is, a seed is generated from the chosen weapon. As described before, the kind of the seed generated from the weapon is defined in advance for each weapon in the program. By referring to the definition, the seed (transmission objective seed data 564a: identification data indicating the kind of the seed) is generated. In a succeeding step S19, the coins used for the generation is subtracted from the possessed coins. That is, in the step S19, from the number of possessed coins indicated by the possessed coin count data 524f, the number of coins used for generating the seed is subtracted, and the possessed coin count data 524f is updated. Succeedingly, in a step S21, the transmission objective seed data 564a is stored in the memory for saved data 56. Then, in a step S23, the usability flag of this weapon in the possessed item data 524g is turned off. That is, the weapon is set to an unusable state.

Here, in this embodiment, in a case that the weapon is not chosen, the process returns to the step S15 as it is, but if cancelled, the transmission setting is suspended, and the process proceeds to the step S25.

Figure 13:
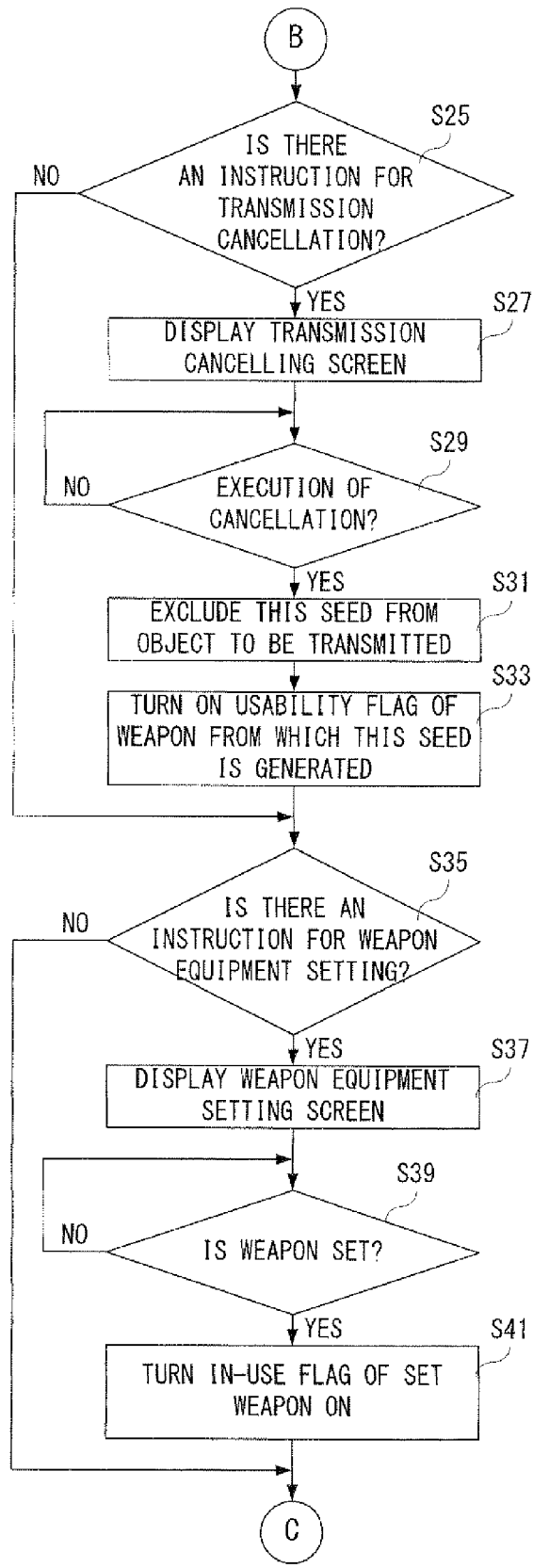
FIG. 13 is a flowchart showing a third part of the game entire processing by the CPU shown in FIG. 3 and being sequel to FIG. 12.

As shown in FIG. 13, in the next step S25, it is determined whether or not these is an instruction for transmission cancellation. If "NO" in the step S25, that is, if there is no instruction for transmission cancellation, the process proceeds to a step S35 as it is. On the other hand, if "YES" in the step S25, that is, if there is an instruction for transmission cancellation, a transmission canceling screen (not illustrated) is displayed in a step S27. In a next step S29, it is determined whether an execution of cancellation or not. If "NO" in the step S29, that is, if not an execution of cancellation, the process returns to the same step S29.

On the other hand, if "YES" in the step S29, that is, if an execution of cancellation, the seed is excluded from the object to be transmitted in a step S31. More specifically, the CPU 50 deletes the transmission objective seed data 564a stored in the memory for saved data 56. In a next step S33, the usability flag of the weapon from which this seed is generated is turned on. That is, this weapon is set to a useable state.

It should be noted that in this embodiment, if not an execution of cancellation, the process returns to the step S29 as it is, but if cancelled, the transmission cancellation is suspended, and then, the process proceeds to the step S35.

In the step S35, it is determined whether or not there is an instruction for weapon equipment setting. If "NO" in the step S35, that is, if there is no instruction for weapon equipment setting, the process proceeds to a step S43 shown in FIG. 14 as it is. On the other hand, if "YES" in the step S35, that is, if there is an instruction for weapon equipment setting, the equipment setting screen 500 as shown in FIG. 8 is displayed on the second LCD 18 in a step S37. Here, the CPU 50 displays images of the weapons in the display region 502 and the display region 504, and displays an image of the seed in the display region 506, with reference to the weapon data 524h.

In a next step S39, it is determined whether or not a weapon is set. Specifically, the CPU 50 determines whether or not the button image 510 is turned on. If "NO" in the step S39, that is, if a weapon is not set, the process returns to the same step S39. Although illustration is omitted, before a weapon is set, the image of the weapon chosen from the list of weapons by the player on the display region 504. At this time, the image of the weapon which has been displayed in the display region 504 up until before is displayed in the display region 502. Here, if cancelled, setting of the weapon is suspended, and the process proceeds to the step S43.

On the other hand, if "YES" in the step S39, that is, if the weapon is set, the in-use flag as to the set weapon is turned on in a step S41, and the process proceeds to the step S43. Although illustration is omitted, an attack parameter as to the set (equipped) weapon is set at this time. Furthermore, the in-use flag as to the weapon which has been equipped up until before is turned off.

Figure 14:
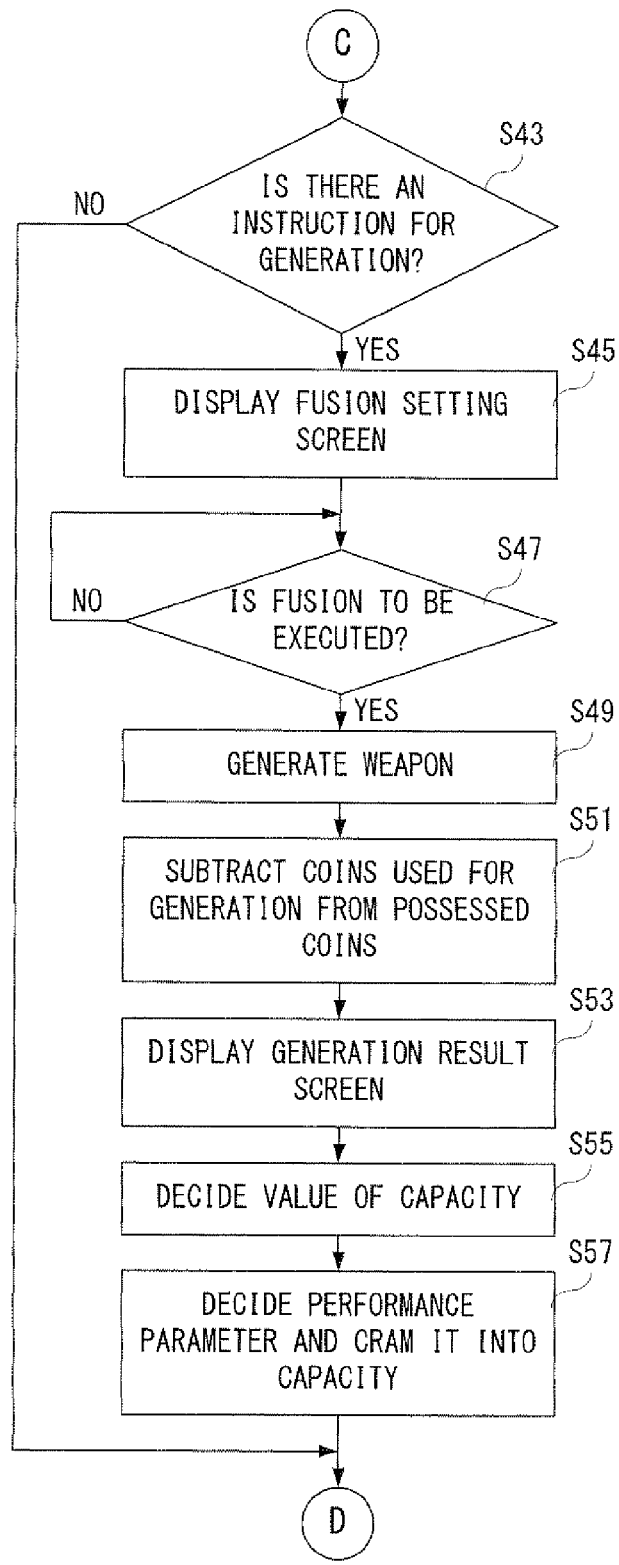
FIG. 14 is a flowchart showing a fourth part of the game entire processing by the CPU shown in FIG. 3 and being sequel to FIG. 13.

As shown in FIG. 14, in the next step S43, it is determined whether or not there is an instruction for generation. If "NO" in the step S43, that is, if there is no instruction for generation, the process proceeds to a step S59 shown in FIG. 15 as it is. On the other hand, if "YES" in the step S43, that is, if there is an instruction for generation, the fusion setting screen 300 as shown in FIG. 5(A) is displayed on the second LCD 18 in a step S45. Here, the CPU 50 displays a list of seeds in the display region 302 with reference to the communication-originated seed data 564b.

In a next step S47, it is determined whether or not fusion is to be executed. That is, the CPU 50 determines whether or not a choice of the two seeds to be fused is accepted from the player, and the button image 310 is turned on. It should be noted that as described above, in a case that the number of possessed coins is fewer than the number of coins necessary for fusion, or in a case that the level of the player character 102 is less than a required level, with reference to the fusion table data 524d, the button image 310 cannot be turned on.

If "NO" in the step S47, that is, if no seed to be fused is chosen, if only one seed to be fused is chosen, or if two seeds to be fused are chosen but the button image 310 is not turned on, it is determined that fusion is not to be executed, and the process returns to the same step S47. On the other hand, if "YES" in the step S47, that is, if two seeds to be fused are chosen, and the button image 310 is turned on, it is determined that fusion is to be executed, and the weapon is generated in a step S49. More specifically, the CPU 50 generates (is made to appear) a weapon corresponding to the chosen two seeds with reference to the fusion table data 524d. In a next step S51, coins used for generation (required for fusing the seeds) are subtracted from the possessed coins. Here, the number of possessed coins indicated by the possessed coin count data 524f is subtracted by the number of coins used for generating the weapon, and the possessed coin count data 524f is updated.

Here, in this embodiment, if fusion is not to be executed, the process returns to the step S47 as it is, but if cancelled, the generation of the character is suspended, and the process proceeds to the step S59.

In a succeeding step S53, the generation result screen 400 as shown in FIG. 5(B) is displayed on the first LCD 16. Furthermore, in a step S55, the value of the capacity as to the generated weapon is decided depending on the elements concerning the game, such as the difficulty level of the game, etc. Then, in a step S57, the performance parameter as to the generated weapon is randomly decided and crammed in the capacity.

The data of the weapons thus fused is additionally stored in the possessed item data 524g. Additionally, the seed data as to the seed used for the fusion is deleted from the communication-originated seed data 564b.

Figure 15:
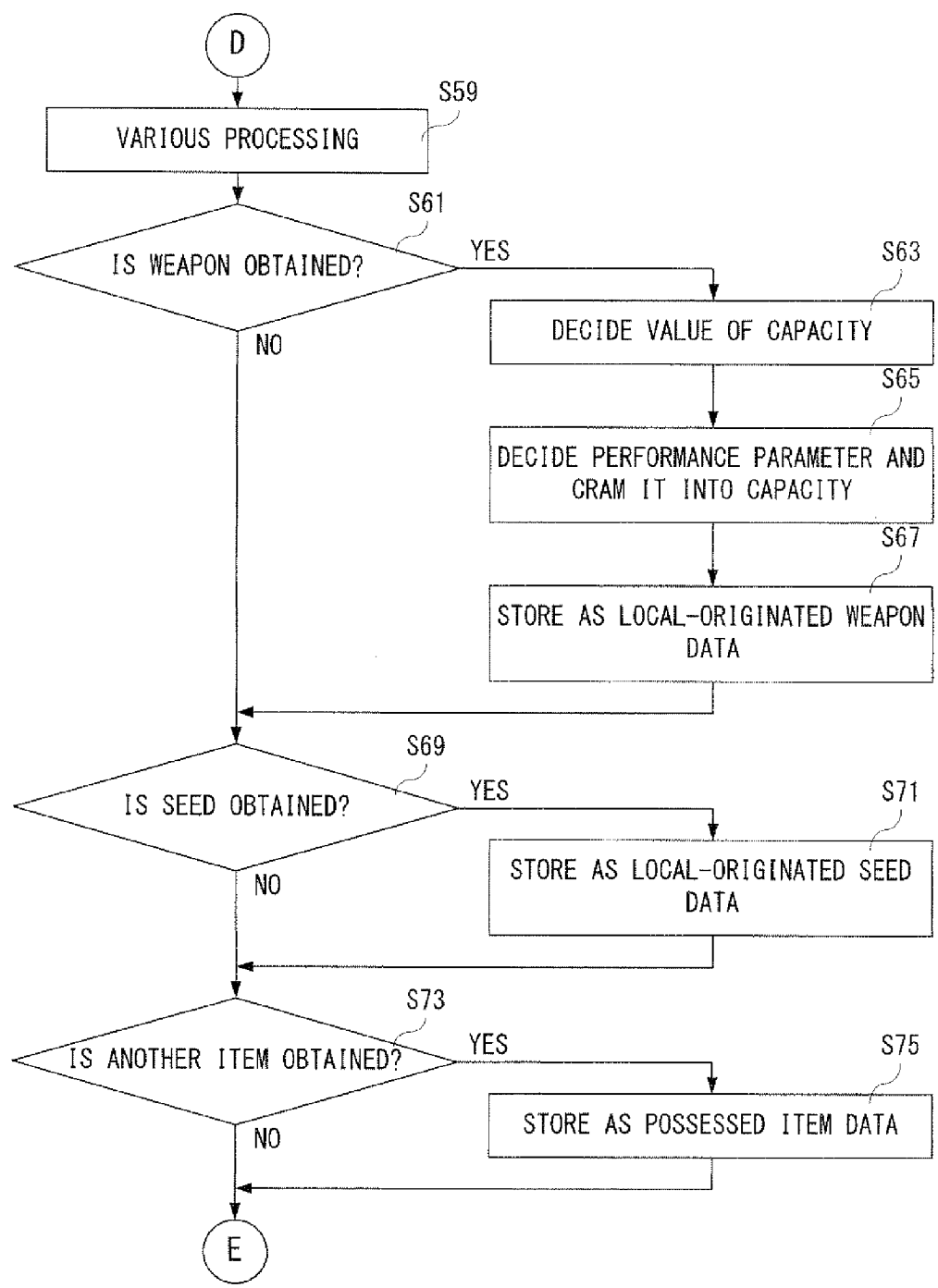
FIG. 15 is a flowchart showing a fifth part of the game entire processing by the CPU shown in FIG. 3 and being sequel to FIG. 14.

As shown in FIG. 15, in the next step S59, various processing is executed. More specifically, the CPU 50 makes the player character 102 move on the game field, buy an item (including weapons), stay, etc. according to an operation by the player. Although illustration is omitted, when the possessed coins are used by buying the item, staying, etc. the used coins are subtracted from the possessed coins, and the possessed coin count data 524f is updated. Then, the bought item is registered as a possessed item of the player character 102, and set to be useable. That is, the possessed item data 524g is updated.

Furthermore, in the step S59, the CPU 50 sometimes fuses the local-originated seeds according to an operation by the player to generate a weapon. In such a case, the coins used for generating the weapon (fusing the seeds) are subtracted from the possessed coins, and the possessed coin count data 524f is updated. At this time, the value of the capacity as the generated weapon is decided depending on the elements concerning the game, and the performance parameter is randomly decided and crammed in the capacity. Moreover, in the step S59, the CPU 50 makes the enemy character 104 appear in the game field and makes it move in the game field.

In a next step S61, it is determined whether or not a weapon is obtained. That is, the CPU 50 determines whether or not there is a weapon in the treasure chest found by the player character 102. If "NO" in the step S61, that is, if a weapon is not obtained, the process proceeds to a step S69. On the other hand, if "YES" in the step S61, that is, if a weapon is obtained, the value of the capacity of this weapon is decided depending on the elements concerning the game in a step S63, and the performance parameter of this weapon is randomly decided and crammed in the capacity in a step S65. Then, in a step S67, the local-originated weapon data 530 corresponding to this weapon is stored in the main memory 52, and the process proceeds to the step S69. That is, in the step S67, the possessed item data 524g is updated.

In the step S69, it is determined whether or not a seed is obtained. That is, the CPU 50 determines whether or not there is a seed in the treasure chest found by the player character 102. If "NO" in the step S69, that is, if no seed is obtained, the process proceeds to a step S73 as it is. On the other hand, if "YES" in the step S69, that is, if a seed is obtained, the data as to the obtained seed is stored in the main memory 52 as local-originated seed data 524i in a step S71, and the process proceeds to the step S73. That is, in the step S71, the local-originated seed data 524i is updated.

In the step S73, it is determined whether or not another item is obtained. That is, the CPU 50 determines whether or not there is an item other than the weapon in the treasure chest found by the player character 102. If "NO" in the step S73, that is, if another item is not obtained, the process proceeds to a step S77 shown in FIG. 16. On the other hand, if "YES" in the step S73, that is, if another item is obtained, data as to the other item obtained is stored in the main memory 52 as possessed item data 524g in a step S75, and the process proceeds to the step S77. That is, in the step S75, the possessed item data 524g is updated.

Figure 16:
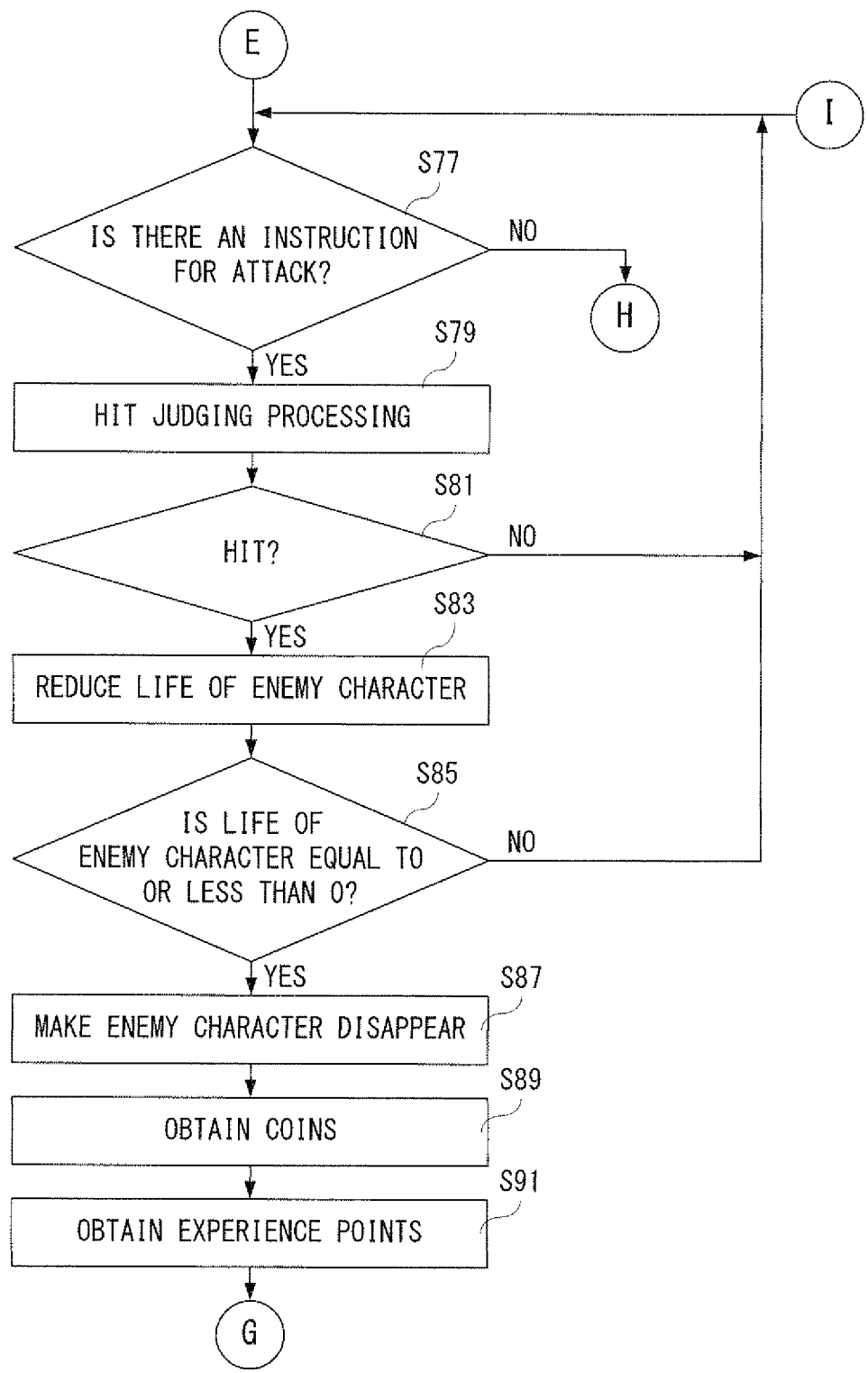
FIG. 16 is a flowchart showing a sixth part of the game entire processing by the CPU shown in FIG. 3 and being sequel to FIG. 15.

As shown in FIG. 16, in the step S77, it is determined whether or not there is an instruction for an attack. Although a detailed description is omitted, the CPU 50 determines whether or not the player performs an attacking operation (instruction) on the basis of the operation data and the touch position data with reference to the operation data buffer 524a. If "NO" in the step S77, that is, if there is no instruction for an attack, the process proceeds to a step S107 shown in FIG. 18. On the other hand, if "YES" in the step S77, that is, if there is an instruction for an attack, hit judging processing is executed in a step S79. That is, the CPU 50 judges whether or not the weapon used by the player character 102 and the bullet fired by the player character 102 collide (hit) with the enemy character 104. The hit judging processing has already been known, and this is not the essential content of the present invention, and therefore, a detailed description is omitted. As described later, this holds true for a judgment whether the attack by the enemy character 104 hits the player character 102.

Succeedingly, in a step S81, it is determined whether or not the attack by the player character 102 hits the enemy character 104. If "NO" in the step S81, that is, if the attack by the player character 102 does not hit the enemy character 104, the process returns to the step S77 as it is. On the other hand, if "YES" in the step S81, that is, if the attack by the player character 102 hits the enemy character 104, the life HP of the enemy character 104 is reduced in a step S83. Here, the CPU 50 subtracts the value evaluated by subtracting the defense power of the enemy character 104 from the attack power of the player character 102 from the life HP of the enemy character 104. Here, in a case that the attack power of the player character 102 is below the defense power of the enemy character 104, the life HP of the enemy character 204 is not subtracted and not added. As described later, this holds true for a case that the attack by the enemy character 104 hits with the player character 102.

In a succeeding step S85, it is determined whether or not the life HP of the enemy character 104 is equal to or less than 0. If "NO" in the step S85, that is, if the life HP of the enemy character 104 is larger than 0, the process returns to the step S77 as it is. On the other hand, if "YES" in the step S85, that is, if the life HP of the enemy character 104 is equal to or less than 0, it is determined that attacking the enemy character 104 is successful, this enemy character 204 is made to disappear in a step S87, and coins are obtained in a step S89. Here, in the step S89, the number of coins decided depending on the kind of the enemy character 104 and the difficulty level can be obtained. More specifically, the number of coins currently obtained is accumulatively added to the number of possessed coins. That is, the possessed coin count data 524*f* is updated.

Figure 17:
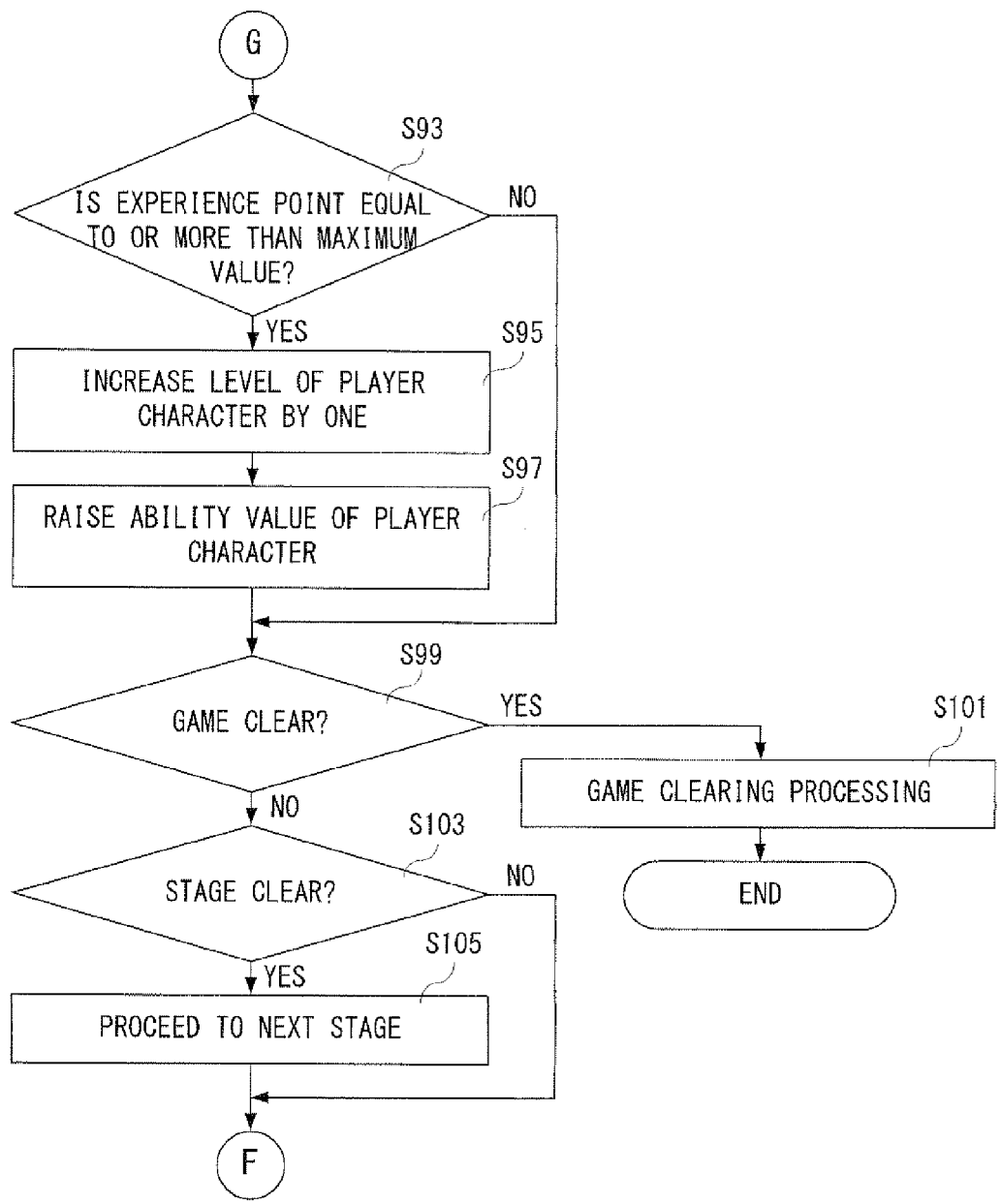
FIG. 17 is a flowchart showing a seventh part of the game entire processing by the CPU shown in FIG. 3 and being sequel to FIG. 16.

Succeedingly, in a step S91, the experience point is obtained. This experience point is also decided depending on the kind of the enemy character 104 and the difficulty level. Accordingly, the value of the experience point currently obtained is accumulatively added to the experience point that has already been obtained. That is, the experience point data included in the player data 524*e* is updated. As shown in FIG. 17, in a next step S93, it is determined whether or not the experience point is equal to or more than the maximum value. Here, the maximum value of the experience point is the maximum value of the experience point at the current level of the player character 102 and is decided for each level in advance.

If "NO" in the step S93, that is, if the experience point is not equal to or more than the maximum value, the process proceeds to a step S99. On the other hand, if "YES" in the step S93, that is, if the experience point is equal to or more than the maximum value, the level of the player character 102 is increased by one in a step S95, the ability value of the player character 102 is raised in a step S97, and the process proceeds to the step S99. That is, in the steps S95 and S97, the level data and the ability value data that are included in the player data 524*e* are updated.

Here, although a detail of the ability value is not described, in the step S97, each element of the ability value is increased by a predetermined step, for example.

Then, in the step S99, it is determined whether game clear or not. Here, the CPU 50 determines whether or not all the stages are cleared. If "YES" in the step S99, that is, if the game clear, game clearing processing is executed in a step S101 to end the game entire processing. For example, in the step S101, the CPU 50 displays a message indicating that the game is cleared, a sound effect or music representing that the game is cleared are output, and the end credits are displayed.

On the other hand, If "NO" in the step S99, that is, if not the game clear, it is determined whether stage clear or not in a step S103. Here, the CPU 50 determines whether or not the goal of the stage has been attained. If "NO" in the step S103, that is, if not the stage clear, the process returns to the step S11 shown in FIG. 12. On the other hand, if "YES" in the step S103, that is, if the stage clear, the process proceeds to a next stage in a step S105, and the process returns to the step S11. At this time, by the progress of the stage, the difficulty level is changed (heightened).

Figure 18:
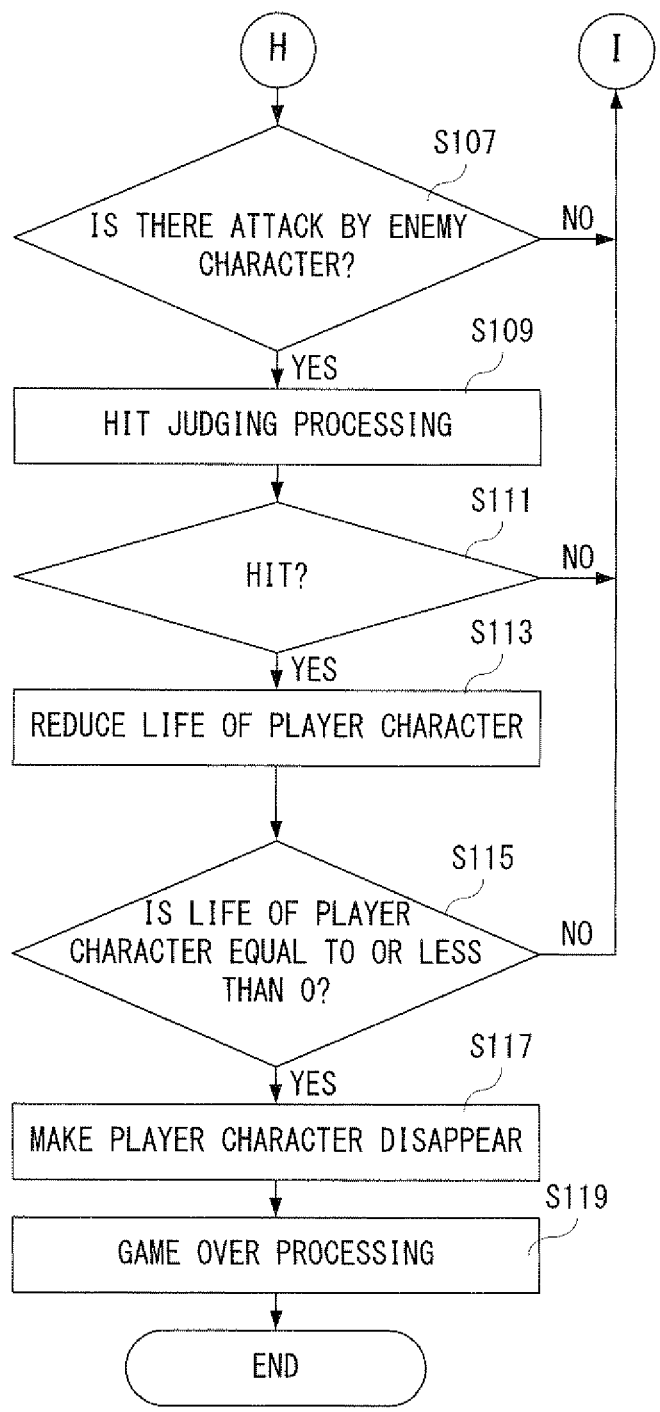
FIG. 18 is a flowchart showing an eighth part of the game entire processing by the CPU shown in FIG. 3 and being sequel to FIG. 16.

As shown in FIG. 18, in a step S107, it is determined whether or not there is an attack by the enemy character 104. That is, the CPU 50 determines whether or not the enemy character 104 is made to attack the player character 102. If "NO" in the step S107, that is, if there is no attack by the enemy character 104, the process returns to the step S77 shown in FIG. 16 as it is. On the other hand, if "YES" in the step S107, that is, if there is an attack by the enemy character 104, hit judging processing is executed in a step S109. In a next step S111, it is determined whether or not the attack by the enemy character 104 hits the player character 102.

If "NO" in the step S111, that is, if the attack by the enemy character 104 does not hit the player character 102, the process returns to the step S77. On the other hand, if "YES" in the step S111, that is, if the attack by the enemy character 104 hits the player character 102, the life HP of the player character 102 is reduced in a step S113, and it is determined whether or not the life HP of the player character 102 is equal to or less than 0 in a step S115.

If "NO" in the step S115, that is, if the life HP of the player character 102 is larger than 0, the process returns to the step S77 as it is. On the other hand, if "YES" in the step S115, that is, if the life HP of the player character 102 is equal to or less than 0, the player character 102 is made to disappear in a step S117, and game over processing is executed in a step S119 to end the game entire processing. In the step S119, the CPU 50 displays a message indicating that the game is over, and outputs a sound effect or music representing that the game is over.

Figure 19:
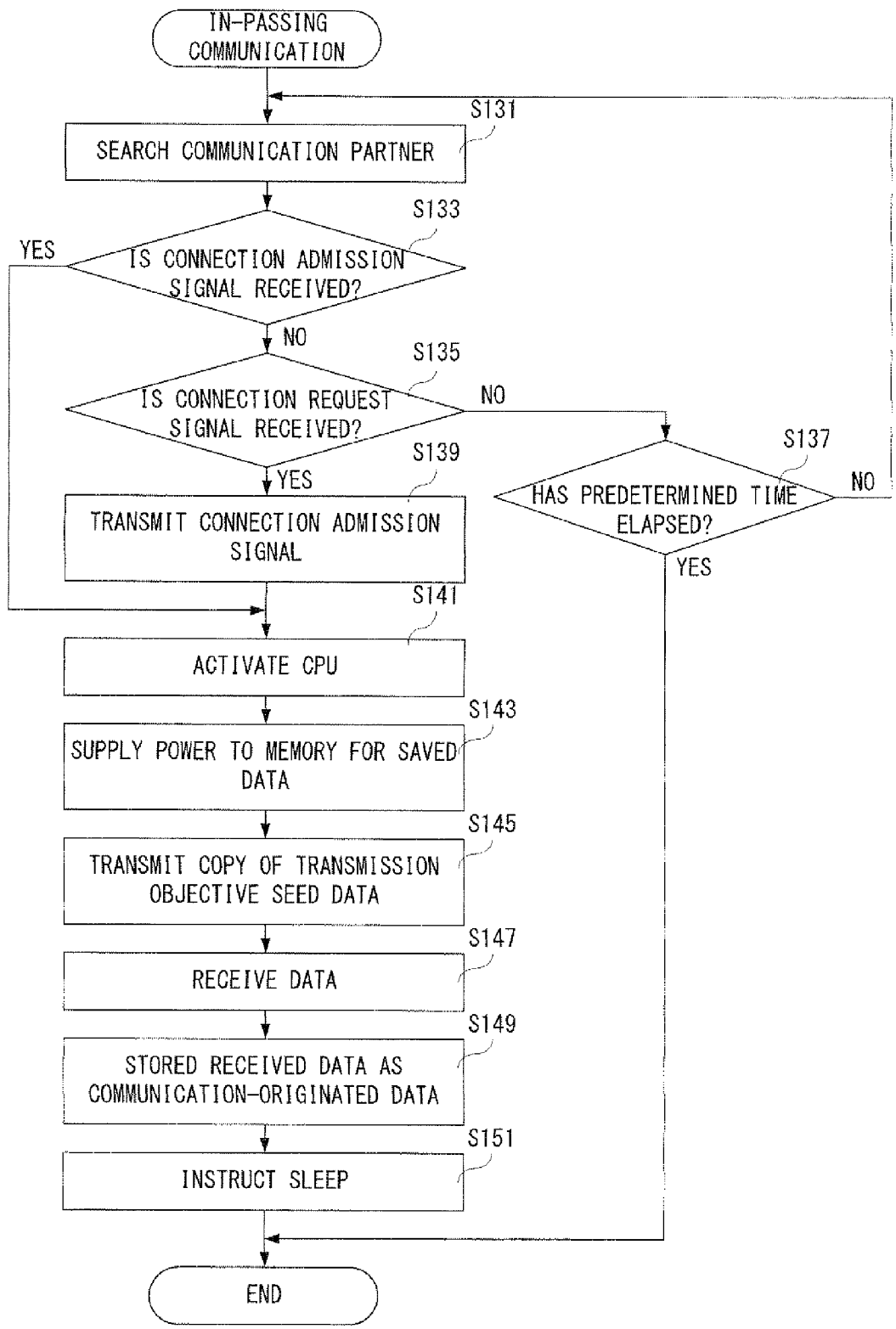
FIG. 19 is a flowchart showing in-passing communication processing by the CPU and a wireless communication module shown in FIG. 3.

FIG. 19 is a flowchart showing in-passing communication processing by the CPU 50 and the wireless communication nodule 64. As shown in FIG. 19, when starting the in-passing communication processing, the wireless communication module 64 searches a communication partner in a step S131. More specifically, transmitting a connection request signal and receiving a connection request signal are tried. In a next step S133, it is determined whether or not a connection admission signal is received. That is, the wireless communication module 64 determines whether or not a connection admission signal transmitted from another game apparatus 10 which has received the connection request signal transmitted from the own apparatus is received.

If "YES" in the step S133, that is, if a connection admission signal is received, it is determined that a connected state is established, and the process proceeds to a step S141. On the other hand, if "NO" in the step S133, that is, if a connection admission signal is not received, it is determined that a connection request signal is received in a step S135.

If "NO" in the step S135, that is, if a connection request signal is not received, it is determined whether or not a predetermined time (five seconds in this embodiment) has elapsed from the start of the in-passing communication processing in a step S137. Although illustration is omitted, when the in-passing communication processing is started, an internal timer of the wireless communication module 64 is started, and it is determined whether or not the timer value is larger than the predetermined time. If "NO" in the step S137, that is, if a predetermined time has not elapsed from the start of the in-passing communication processing, the process returns to the step S131. On the other hand, if "YES" in the step S137, that is, if a predetermined time has elapsed from the start of the in-passing communication processing, the in-passing communication processing is ended as it is.

Alternatively, if "YES" in the step S135, that is, if a connection request signal is received, a connection admission signal is transmitted to the game apparatus 10 which has transmitted the connection request signal in a step S139. Thus, a communication state is established.

In the next step S141, the CPU 50 is activated. That is, the wireless communication module 64 operates a clock of the CPU 50. Thereupon, the CPU 50 starts data transmitting and receiving processing, and supplies power to the memory for saved data 56 in a step S143. More specifically, the CPU 50 instructs the microcomputer 68 to supply power to the memory for saved data 56, and the microcomputer 68 controls the power supply circuit 70 to start supplying power to the memory for saved data 56.

In a succeeding step S145, the copy of the transmission objective seed data 564a is transmitted. The copy of the transmission objective seed data 564a is thus transmitted, and therefore, until the transmission setting as to the transmission objective seed data 564a is cancelled, it can be transmitted any number of times in the next in-passing communication processing onward. In a next step S147, data from the communication partner is received. Succeedingly, in a step S149, the received data is stored in the memory for saved data 56 as communication-originated seed data 564b. Then, in a step S151, the microcomputer 68 is instructed to sleep, and the in-passing communication processing is ended. Then, the microcomputer 68 controls the power supply circuit 70 to stop supplying power to the memory for saved data 56, and stops the clock of the CPU 50.

In addition, when the in-passing communication processing is ended, after a predetermined time (30 seconds, for example) has elapsed, the in-passing communication processing is restarted.

Also, as described above, in a case that in-passing communication processing is executed in the normal mode, the CPU 50 is being activated and supplies power to the memory for saved data 56, and thus, the processing in the step S141, the step S143, the step S149 and the step S151 are not required.

According to this embodiment, a seed is generated from a weapon and is transmitted and received with another game apparatus, and two seeds obtained by reception are fused with each other to generate a weapon, and this brings an enjoyment to imagine what kind of weapon is generated. That is, it is possible to increase interest of data transmission and reception, and game playing.

Furthermore, in this embodiment, two seeds obtained by data reception need to be fused to each other, and as for conditions, use of some coins and the level of the player character are offered, and therefore, it is impossible to use the seed received from other game apparatuses, etc. as a weapon as it is. Accordingly, for example, in a case that the player plays the game for a long time to transmit game data with high influence (very high attack power), if a player who does not play the game so long receives the game data, he or she cannot use it immediately, and therefore, there is no inconvenience of capable of obtaining and using the weapon which cannot be used at the beginning of the game. That is, it is possible to prevent the game balance from being lost.

Also, in this embodiment, by using the wireless communication module, the transmission objective seed data is transmitted and received (exchanged) by the in-passing communication processing, but there is no need of being restricted. For example, in a case that the game apparatus is in the normal mode, by using the local communication module, it can transmit and receive the transmission objective seed data with another game apparatus of the same kind. In such a case, the transmission objective seed data is temporarily stored in the transmission/reception data buffer, and then transmitted to the other game apparatus being an object to be communicated. Furthermore, the seed data may be exchanged without making communications. For example, the seed data is stored in an external memory detachable to a game apparatus such as an SD card, and by exchanging the external memory with the player of another game apparatus, the seed data may be exchanged. In a case that a communication is made by the local communication module and in a case that the external memory is utilized, it is possible to easily exchange the seed data with friend and acquaintances, for example.

Also, in this embodiment, in accordance with the defeat of the enemy character, it is determined that the attack (game) is successful to thereby obtain coins and experience points, but there is no need of being restricted thereto. In a case that an attack hits the enemy character, it is determined that the attack (game) is successful to thereby obtain coins and experience points in each case.

In addition, in this embodiment, two seeds are fused, but by using coins, or by raising the level of the player character higher than a required level (constant level), a weapon may be generated from one seed. Furthermore, three or more seeds may be fused. In addition, in a case that two or more seeds are fused, no coin may be used, and the level of the player character may not be conditioned. Moreover, in addition to the number of coins and the level of the player character, the number of cleared stages may be conditioned. That is, as for the generation of a weapon from seeds, various conditions or methods can be set.

In addition, in this embodiment, one seed is generated based on one weapon, and the transmission objective seed data corresponding to the one seed is transmitted, but there is no need of being restricted thereto. For example, a plurality of seeds are generated based on each of a plurality of weapons, and transmission objective seed data corresponding to the plurality of seeds may be transmitted. In a case that the seed is excluded from an object to be transmitted here, a list of seeds is displayed, and the player may choose a seed to be excluded from the object to be transmitted.

Furthermore, in this embodiment, the transmission objective seed data corresponding to the seed is transmitted, and data is received from a communication partner, but there is no need of being restricted thereto. For example, only transmission of the transmission objective seed data may be executed, or only reception of data may be executed. Moreover, if data reception is only executed, transmission objective seed data need not be set.

Also, in this embodiment, a description is made only on a portable game apparatus, but there is no need of being restricted thereto. For example, this can be applied to other electronic appliances (information processing apparatus), such as a console-type game apparatus, a personal computer, a FDA, and a cellular phone having a game function.

Moreover, the configuration of the game apparatus need not be limited to the embodiment. For example, one camera or no camera may be possible. Furthermore, the touch panel may be provided on two LCDs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium comprising a game program which, when executed, causes a processor of a game apparatus configured to make a communication to:
    advance a game according to an operation by a player;
    store local-originated game data being obtained game data in a storage;
    advance said game by using said local-originated game data or making said local-originated game data usable;
    choose at least one game data from said local-originated game data based on an operation by the player;
    generate seed data from the chosen at least one game data;

transmit the generated seed data to another game apparatus, said seed data which was transmitted once to said other game apparatus is repetitively set to be transmittable;
receive seed data transmitted from another game apparatus, the seed data being different from the local-originated game data and being used to generate game data;
store the received seed data in said storage; and
generate, when the seed data stored in said storage satisfies a condition, game data on the basis of at least two seed data stored in said storage, wherein
said game is advanced by using said local-originated game data and communication-originated game data which is the generated game data.

2. The non-transitory storage medium according to claim 1, wherein
the condition is to combine two or more seed data.

3. The non-transitory storage medium according to claim 1, wherein
a point is given by further advancing said game according to an operation by the player, and point data as to said point is cumulatively stored in said storage, and
the condition is that a value indicated by said point data is equal to or more than a threshold value.

4. The non-transitory storage medium according to claim 1, wherein said game program further causes said processor to:
set said chosen local-originated game data to be unusable in said game; and
set, when a choice of said local-originated game data is cancelled, said local-originated game data to a using state or a useable state.

5. The non-transitory storage medium according to claim 1, wherein
said communication-originated game data includes at least one parameter, and
a value of the parameter included in said communication-originated game data is randomly changed when the game processing based on said communication-originated game data is performed.

6. The non-transitory storage medium according to claim 5, wherein
a point is given by further advancing said game according to an operation by the player,
point data indicating said point is cumulatively stored in said storage, and
a changed value for changing the value of said parameter included in said communication-originated game data is restricted based on the point indicated by at least said point data.

7. The non-transitory storage medium according to claim 1, wherein
said local-originated game data includes at least one parameter, and
the value of the at least one parameter included in said local-originated game data is randomly changed when the game processing based on said local-originated game data is performed in said game.

8. The non-transitory storage medium according to claim 1, wherein
a short distance wireless communication is executed.

9. The non-transitory storage medium according to claim 8, wherein
said game apparatus is a portable game apparatus.

10. The non-transitory storage medium according to claim 9, wherein
another game apparatus existing in a coverage area is repetitively searched to automatically make a wireless connection, and said seed data is automatically received from said other game apparatus with which said wireless connection is made.

11. The non-transitory storage medium according to claim 1, wherein
said seed data is given by further advancing said game and the obtained local-originated seed data is stored as said seed data in said storage, and
at least one of said communication-originated seed data and said local-originated seed data is chosen.

12. The non-transitory storage medium according to claim 1, wherein said seed data that is generated from chosen locally-originated game data by said another game apparatus and transmitted from said another game apparatus is received.

13. A game apparatus comprising at least one processor and configured to make a communication, the game apparatus configured to:
advance a game according to an operation by a player;
store local-originated game data being obtained game data in a storage;
advance said game by using said local-originated game data or making said local-originated game data usable;
choose at least one game data from said local-originated game data based on an operation by the player;
generate seed data from the chosen at least one game data;
transmit the generated seed data to another game apparatus, said seed data which was transmitted once to said other game apparatus is repetitively set to be transmittable;
receive seed data transmitted from another game apparatus, the seed data being different from the local-originated game data and being used to generate game data;
store the received seed data in said storage; and
generate, when the seed data stored in said storage satisfies a condition, game data on the basis of at least two seed data stored in said storage, wherein
said game is advanced by using said local-originated game data and communication-originated game data which is the generated game data.

14. A game controlling method of a game apparatus configured to make a communication and having a storage, the method comprising:
advancing a game according to an operation by a player;
storing local-originated game data being obtained game data in a storage;
advancing said game by using said local-originated game data or making said local-originated game data usable;
choosing at least one game data from said local-originated game data based on an operation by the player;
generating seed data from the chosen at least one game data;
transmitting the generated seed data to another game apparatus, said seed data which was transmitted once to said other game apparatus is repetitively set to be transmittable;
receiving seed data transmitted from another game apparatus, the seed data being different from the local-originated game data and being used to generate game data;
storing the received seed data in said storage;
generating, when the stored seed data satisfies a condition, game data on the basis of at least two seed data stored in said storage; and
advancing said game by using said local-originated game data and communication-originated game data which is the generated game data.

15. A game system having a plurality of game apparatuses configured to make a communication, each of said game apparatuses comprising:
  a processing system having at least one processor, the processing system configured to:
    advance a game according to an operation by a player,
    store local-originated game data being obtained game data in a storage,
    advance said game by using said local-originated game data or making said local-originated game data usable,
    choose at least one game data from said local-originated game data based on an operation by the player,
    generate seed data from the chosen at least one game data,
    transmit the generated seed data to another game apparatus, said seed data which was transmitted once to said other game apparatus is repetitively set to be transmittable,
    receive seed data transmitted from another game apparatus, the seed data being different from the local-originated game data and being used to generate game data,
    store the received seed data in said storage, and
    generate, when the seed data stored in said storage satisfies a condition, game data on the basis of at least two seed data stored in said storage, wherein
    said game is advanced by using said local-originated game data and communication-originated game data which is the generated game data.

16. A game system comprising a first game apparatus and a second game apparatus configured to make a communication with each other,
  said first game apparatus configured to:
    advance a game according to an operation by a player;
    store local-originated game data being obtained game data in a storage;
    advance said game by using said local-originated game data or making said local-originated game data usable;
    choose at least one game data from said local-originated game data;
    transform seed data from the chosen at least one game data, the seed data being different from said local-originated game data and being used to generate game data; and
    transmit the transformed seed data to said second game apparatus, the transformed seed data which was transmitted once to said second game apparatus is repetitively set to be transmittable;
  said second game apparatus configured to:
    receive seed data transmitted from said first game apparatus; and
    generate game data by using the received seed data and seed data stored in a storage.

* * * * *